(12) United States Patent
Hayashi

(10) Patent No.: US 10,530,943 B2
(45) Date of Patent: Jan. 7, 2020

(54) INFORMATION PROCESSING SYSTEM CONFIGURED TO MAINTAIN APPLICATION STATE INFORMATION ASSOCIATED WITH AN APPLICATION, INFORMATION PROCESSING APPARATUS, AND INFORMATION PROCESSING METHOD

(71) Applicant: Yuuichiroh Hayashi, Kanagawa (JP)

(72) Inventor: Yuuichiroh Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/122,211

(22) Filed: Sep. 5, 2018

(65) Prior Publication Data

US 2019/0098153 A1    Mar. 28, 2019

(30) Foreign Application Priority Data

Sep. 25, 2017 (JP) .................................. 2017-184190

(51) Int. Cl.
*H04N 1/00* (2006.01)
(52) U.S. Cl.
CPC ....... *H04N 1/00474* (2013.01); *H04N 1/0097* (2013.01); *H04N 1/00482* (2013.01); *H04N 1/00949* (2013.01); *H04N 2201/0094* (2013.01)
(58) Field of Classification Search
CPC .................................................. H04N 1/00474
USPC ........................................................ 358/1.15
See application file for complete search history.

(56) References Cited

U.S. PATENT DOCUMENTS

| 2012/0117570 A1* | 5/2012 | Ozaki ..................... G06Q 10/06 718/102 |
| 2012/0260333 A1* | 10/2012 | Uchikawa ............... G06F 21/84 726/17 |
| 2013/0307774 A1 | 11/2013 | Hayashi et al. |
| 2014/0223150 A1 | 8/2014 | Honda et al. |

(Continued)

FOREIGN PATENT DOCUMENTS

| JP | 2000-305776 | 11/2000 |
| JP | 2004-112636 | 4/2004 |
| JP | 2004-259102 | 9/2004 |

OTHER PUBLICATIONS

U.S. Appl. No. 15/760,371, filed Oct. 25, 2016, Ryutaro Sakanashi, et al.

*Primary Examiner* — Jacky X Zheng
(74) *Attorney, Agent, or Firm* — Harness, Dickey & Pierce P.L.C.

(57) ABSTRACT

An information processing system includes: a memory to store, for each one of a plurality of applications for providing a specific application, flow information defining a series of processes to be executed on electronic data to provide the specific service of the application; and application state information indicating whether the application is available; and circuitry to: in response to a request from the electronic device, control a display of the electronic device to display a screen for allowing selection of one or more of the plurality of applications whose application state information indicates that the application is available, and in response to reception of a selection of one of the one or more applications that are selectable, control the electronic device to execute the series of processes on the electronic data according to the flow information of the selected application.

20 Claims, 21 Drawing Sheets

(56) References Cited

U.S. PATENT DOCUMENTS

| | | |
|---|---|---|
| 2015/0156340 A1 | 6/2015 | Yamano et al. |
| 2015/0229788 A1* | 8/2015 | Shimizu ............ H04N 1/00244 358/1.13 |
| 2016/0117340 A1 | 4/2016 | Hayashi |
| 2016/0259933 A1 | 9/2016 | Sugimura et al. |
| 2016/0266977 A1 | 9/2016 | Hayashi et al. |
| 2016/0274945 A1* | 9/2016 | Namihira .............. G06F 3/1203 |
| 2017/0083697 A1 | 3/2017 | Hayashi et al. |
| 2017/0109194 A1 | 4/2017 | Namihira et al. |
| 2017/0255486 A1 | 9/2017 | Zhang et al. |
| 2017/0255495 A1 | 9/2017 | Sakanashi et al. |
| 2017/0346981 A1 | 11/2017 | Hayashi |
| 2018/0013913 A1 | 1/2018 | Hayashi et al. |
| 2018/0121646 A1 | 5/2018 | Sakanashi et al. |

* cited by examiner

| APPLICATION ID | APPLICATION STATE |
|---|---|
| app001 | UNRELEASED |
| app002 | AVAILABLE (NOT-EDITABLE) |
| app003 | TEMPORARILY SUSPENDED (NOT-EDITABLE) |
| ⋮ | ⋮ |

| USER ID | APPLICATION STATE |
|---------|-------------------|
| user001 | ADMINISTRATOR AUTHORITY |
| user002 | DEVELOPER AUTHORITY |
| user003 | GENERAL AUTHORITY |
| ⋮ | ⋮ |

FIG. 9

| DATA TYPE BEFORE CONVERSION | DATA TYPE AFTER CONVERSION | TYPE CONVERSION TO BE GENERATED |
|---|---|---|
| InputStream | LocalFilePath | FIRST TYPE CONVERSION |
| LocalFilePath | File | SECOND TYPE CONVERSION |
| ⋮ | ⋮ | ⋮ |

REGISTRATION OF APPLICATION — REGISTRATION — G200

| SELECT TYPE | BASIC SETTING | DETAILED SETTING | SCAN SETTING | PRINT SETTING |

PLEASE SET DEFAULT VALUES OF SCANNING — SETTING AVAILABILITY G220

G210

- SHEET ORIENTATION: READABLE ORIENTATION ▽ ✓
- SINGLE SIDE/DOUBLE SIDE: DOUBLE SIDE ▽
- SCANNING COLOR MODE: AUTO SELECT ▽
- SCANNING RESOLUTION: 300dpi ▽ ✓
- SCANNING SIZE: Auto ▽ ✓

NEXT

FIG. 14

```
                                                                 G300
┌─────────────────────────────────────────────────────────────────┐
│ REGISTRATION OF APPLICATION                       REGISTRATION  │
│  ┌────────┬────────┬────────┬────────┬────────┐                 │
│  │ SELECT │ BASIC  │DETAILED│ SCAN   │ PRINT  │                 │
│  │ TYPE   │SETTING │SETTING │SETTING │SETTING │                 │
│                                            SETTING              │
│  PLEASE SET DEFAULT VALUES OF PRINTING   AVAILABILITY  G320     │
│                                    G310                         │
│    NUMBER OF COPIES:    [ 1              ▽ ]  [ ✓ ]             │
│    PRINTING COLOR MODE: [ BLACK AND WHITE ▽ ]  [   ]            │
│    PRINTING SIDE:       [ SINGLE SIDE    ▽ ]  [   ]             │
│                                                                 │
│                                                      [ NEXT ]   │
└─────────────────────────────────────────────────────────────────┘
```

FIG. 15

```
                                                          G400
┌─────────────────────────────────────────────────────────┐
│ REGISTRATION OF APPLICATION              REGISTRATION   │
│ ┌─────────────────────────────────────────────────────┐ │
│ │ SELECT │ BASIC   │ DETAILED│ SCAN    │ PRINT   │░░░│ │
│ │ TYPE   │ SETTING │ SETTING │ SETTING │ SETTING │░░░│ │
│ │ PLEASE CONFIRM APPLICATION INFORMATION THAT HAS BEEN SET│
│ │                                              G410    │
│ │  ┌──────────────────────────────────────────┐        │
│ │  │ Title:QR CODE                            │        │
│ │  │     (REGISTERED TRADEMARK) PRINTING APPLICATION │ │
│ │  │ Description:                             │        │
│ │  │ Target flow:translate-mail               │        │
│ │  │ Application view:                        │        │
│ │  │  parameters                              │        │
│ │  │   ...                                    │        │
│ │  └──────────────────────────────────────────┘        │
│ │                                                      │
│ │       [ BACK ] [ NEXT ] [ REGISTER ] [ CANCEL ]      │
│ └─────────────────────────────────────────────────────┘ │
└─────────────────────────────────────────────────────────┘
                                  G420
```

FIG. 16

```
                                                          ⌐1200
┌─────────────────────────────────────────────────────────┐
│                                                         │
│  "app_type" : "scan&print",    ⎬1201                    │
│  "appName" : "QR CODE PRINT APPLICATION"                │
│  "displayName" : {                                      │
│         "Japanese" :"QRコード印刷",                      │
│         "English" :"QRCode print"                       │
│  },                                                     │
│  "flowName":"code-print",      ⎬1202                    │
│              (OMITTED)                                  │
│  ┌───────────────────────────────────────┐              │
│  │ "defaultScannerSettings": {           │              │
│  │      "originalOrientation": "readable",│             │
│  │      "originalSide": "one_sided",     │┌--- 1203     │
│  │      "scanColor": "auto_color",       │              │
│  │      "scanResolution": "300"          │              │
│  │ },                                    │              │
│  ├───────────────────────────────────────┤              │
│  │ "defaultPrinterSettings": {           │              │
│  │      "copies": 1,                     │              │
│  │      "printColor": "monochrome",      │┌--- 1204     │
│  │      "printSide": "one_sided"         │              │
│  │ }                                     │              │
│  └───────────────────────────────────────┘              │
└─────────────────────────────────────────────────────────┘
```

CHANGE OF APPLICATION STATE

■ CHANGE OR APPLICATION STATE

| | | |
|---|---|---|
| APPLICATION NAME | QR CODE PRINT APPLICATION | |
| TYPE | SCAN & PRINT | |
| CURRENT APPLICATION STATE | UNRELEASED | |
| REGISTRATION DATE/TIME | 2017/01/01 00:00:00 | |

G510 — CHANGE OF APPLICATION STATE

G520:
- UNRELEASED
- AVAILABLE
- TEMPORARILY SUSPENDED
- PROHIBITED FROM APPLYING NEW LICENSE

CHANGE OF APPLICATION STATE

■ CHANGE OF APPLICATION STATE

| | |
|---|---|
| APPLICATION NAME | QR CODE PRINT APPLICATION |
| TYPE | SCAN & PRINT |
| CURRENT APPLICATION STATE | AVAILABLE (NOT-EDITABLE) |
| REGISTRATION DATE/TIME | 2017/01/01 00:00:00 |

CHANGE OF APPLICATION STATE

G610 — EDIT-AVAILABILITY

G620:
- EDITABLE
- NOT-EDITABLE

G630 — OK

INFORMATION PROCESSING SYSTEM CONFIGURED TO MAINTAIN APPLICATION STATE INFORMATION ASSOCIATED WITH AN APPLICATION, INFORMATION PROCESSING APPARATUS, AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2017-184190, filed on Sep. 25, 2017, in the Japan Patent Office, the entire disclosure of which is hereby incorporated by reference herein.

BACKGROUND

Technical Field

The present invention relates to an information processing system, an information processing apparatus, and an information processing method.

Description of the Related Art

In recent years, a service, etc., for providing a function with combination of multiple functions (e.g., scanning, printing, mail delivering, etc.) has been known. For example, a mail delivering service, etc., of an electronic file (e.g., an image file), which is generated by scanning, after performing a predetermined process on the electronic file is known. Such a service as above is achieved by executing one or more processes for achieving each function as a series of processes.

SUMMARY

Example embodiments of the present invention include an information processing system communicably connected with an electronic device. The system includes: a first memory to store, for each one of a plurality of applications registered to the information processing system for providing a specific application, flow information defining a series of processes to be executed by the electronic device on electronic data to provide the specific service of the application, the flow information associating identification information for identifying each of components performing the series of processes and an execution order of the series of processes; a second memory to store, for each one of the plurality of applications, application state information indicating whether the application is available; and circuitry to: in response to a request from the electronic device, control a display of the electronic device to display a screen for allowing selection of one or more of the plurality of applications whose application state information indicates that the application is available, and in response to reception of a selection of one of the one or more applications that are selectable, control the electronic device to execute the series of processes on the electronic data according to the flow information of the selected application.

Example embodiments of the present invention include an information processing apparatus that functions as the information processing system, an information processing method performed by the information processing system, and a non-transitory recording medium storing a control program for the information processing system.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 5 is a diagram illustrating an example of application state information according to an embodiment;

FIG. 7 is a diagram illustrating an example of authority information according to an embodiment;

FIG. 9 is a diagram illustrating an example of a type conversion information table according to an embodiment;

FIG. 13 is a diagram illustrating an example of the application registration screen (2/4) according to an embodiment;

FIG. 14 is a diagram illustrating an example of the application registration screen (3/4) according to an embodiment;

FIG. 15 is a diagram illustrating an example of an application registration screen (4/4) according to an embodiment;

FIG. 16 is a diagram illustrating an example of application state information according to an embodiment;

FIG. 18 is a diagram illustrating an example of application state changing screen according to an embodiment;

FIG. 19 is a diagram illustrating another example of the application state changing screen according to an embodiment;

Figure 1:
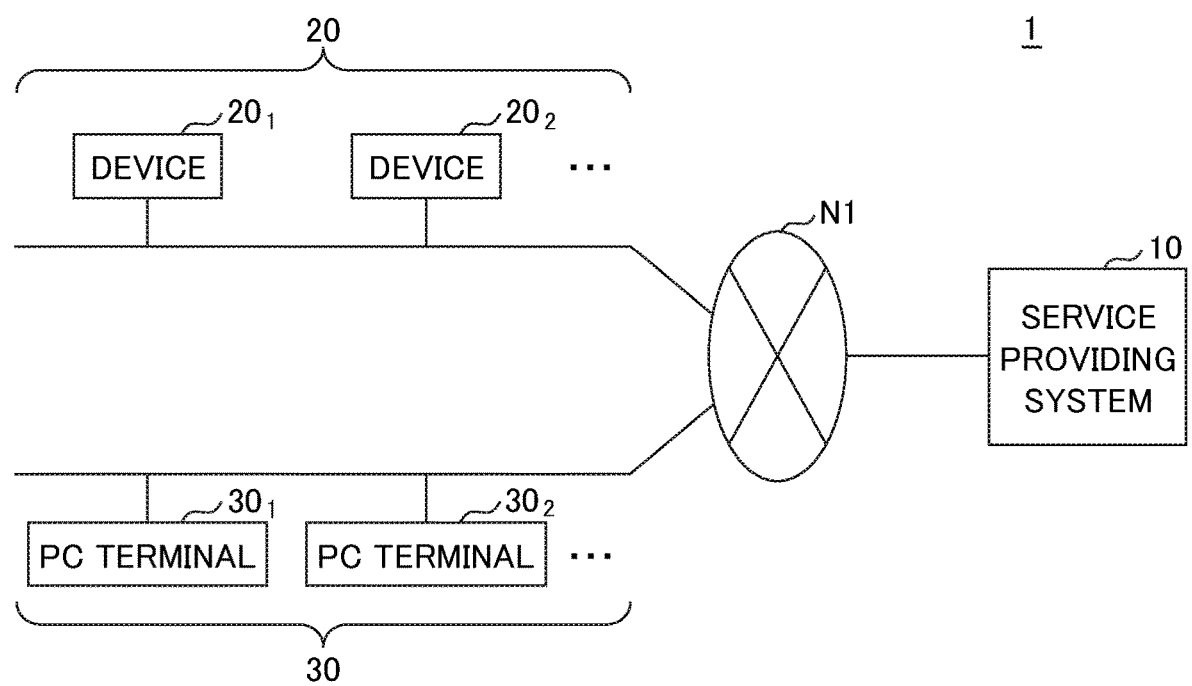
FIG. 1 is a diagram illustrating an example of a system configuration of an information processing system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The following description explains in detail an embodiment of the present invention, with reference to drawings.

<System Configuration>

First, with reference to FIG. 1, a system configuration of an information processing system 1 according to the present embodiment is explained. FIG. 1 is a diagram illustrating an example of a system configuration of the information processing system 1 according to the present embodiment.

The information processing system 1 illustrated in FIG. 1 includes a service providing system 10, a device 20, and a personal computer (PC) terminal 30, which are connected via a wide area network N1 such as the Internet so as to be able to communicate with each other.

The service providing system 10 is implemented by one or more information processing apparatuses. Further, the service providing system 10 provides, via the network N1, various kinds of services, which are implemented by a series of processes with combination of one or more of multiple processes for achieving various functions.

Here, a function is a function relating to an electronic file such as a document file or an image file. Examples of a function include printing, scanning, facsimile transmission, conversion of data formats, mail delivering, optical character recognition (OCR) processing, modifying, compression/decompression, storing in a repository, etc.

A specific example of services provided by the service providing system 10 according to the present embodiment is described later. Note that, in the following description, a series of processes may be referred to as a "process flow".

A device 20 is an electronic device used by a user. That is to say, a device 20 may be, for example, an image forming apparatus such as a multifunction peripheral (MFP), a PC, a projector, an electronic blackboard, a digital camera, etc. A user is able to use a device 20 for utilizing various types of services provided by the service providing system 10.

Note that, in the following description, to distinguish multiple devices 20, an index is used in such a way as "device 20₁" or "device 20₂".

A PC terminal 30 may be, for example, a desktop PC, a laptop PC, a smartphone, a tablet terminal, etc., used by a user. A user is able to use a PC terminal 30 for utilizing various types of services provided by the service providing system 10.

Note that, in the following description, to distinguish multiple PC terminals 30, an index is used in such a way as "PC terminal 30₁" or "PC terminal 30₂".

Note that the configuration of the information processing system 1 illustrated in FIG. 1 is an example and there may be another configuration. For example, the information processing system 1 according to the present embodiment may include one or more devices for performing at least one of inputting and outputting electronic data, so that the devices utilize various kinds of services provided by the service providing system 10.

<Hardware Configuration>

Figure 2:
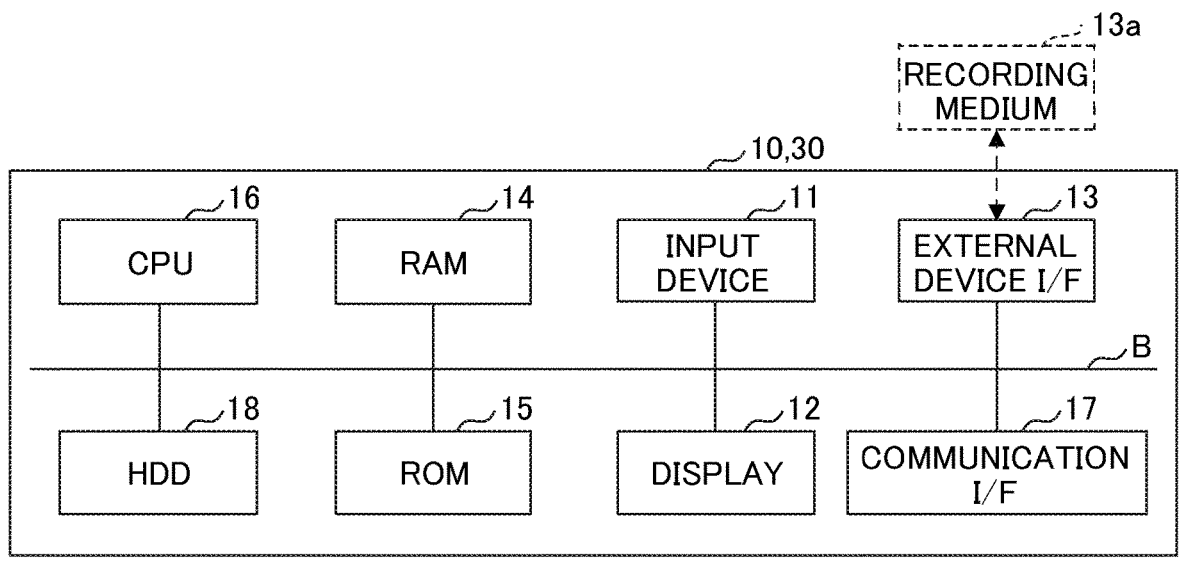
FIG. 2 is a diagram illustrating an example of a hardware configuration of a service providing system and a PC terminal according to an embodiment.

Next, a hardware configuration of the service providing system 10 and a PC terminal 30 included in the information processing system 1 according to the present embodiment is explained, with reference to FIG. 2. FIG. 2 is a diagram illustrating an example of a hardware configuration of the service providing system 10 and a PC terminal 30 according to the present embodiment. Note that the service providing system 10 and a PC terminal 30 have the same hardware configuration. Therefore, in the following description, the hardware configuration of the service providing system 10 is mainly explained.

The service providing system 10 illustrated in FIG. 2 includes an input device 11, a display 12, an external device interface (I/F) 13, and a random access memory (RAM) 14. Furthermore, the service providing system 10 includes a read only memory (ROM) 15, a central processing unit (CPU) 16, a communication I/F 17, and a hard disk drive (HDD) 18. Each of the above hardware is mutually connected via a bus B.

The input device 11 may include a keyboard, a mouse, a touchscreen, etc., and is used by a user to input an instruction to generate an operation signal. The display 12 may include a display, etc., and displays a processing result from the service providing system 10. Note that there may be such a configuration that at least one of the input device 11 and the display 12 is connected to the service providing system 10, when needed, and is utilized.

The communication I/F 17 is an interface for connecting the service providing system 10 to the network N1. Hence, the service providing system 10 is capable of performing communication via the communication I/F 17.

The HDD 18 is a non-volatile memory storing a program, data, etc. A program, data, etc., stored in the HDD 18 may be an operating system (OS), which is basic software for generally controlling the service providing system 10, application software for providing various functions on the OS, etc.

Note that the service providing system 10 may use a drive device (e.g., a solid state drive or SSD), which utilizes a flash memory, instead of the HDD 18, as a memory medium. Furthermore, the HDD 18 manages a stored program or data in a predetermined file system and/or database (DB).

The external device I/F 13 is an interface to an external device. An external device may be a recording medium 13a, etc. Hence, the service providing system 10 is capable of reading or writing from or onto the recording medium 13a via the external device I/F 13. The recording medium 13a may be a flexible disk, a compact disk (CD), a digital versatile disk (DVD), a secure digital (SD) memory card, a universal serial bus (USB) memory, etc.

The ROM 15 is a non-volatile semiconductor memory that is capable of retaining a program, data, etc., even when the power is turned off. The ROM 15 stores a program, data, etc., such as a basic input/output system (BIOS), which is executed when booting the service providing system 10, an OS setting, and a network setting. The RAM 14 is a volatile semiconductor memory that temporarily stores a program, data, etc.

The CPU 16 is an arithmetic device that retrieves a program or data from a memory such as the ROM 15 or the HDD 18 onto the RAM 14 for executing a process so as to achieve general control or a function of the service providing system 10.

Having the hardware configuration illustrated in FIG. 2, it is possible that the service providing system 10 and a PC terminal 30 according to the present embodiment achieve various processes as described below.

Figure 3:
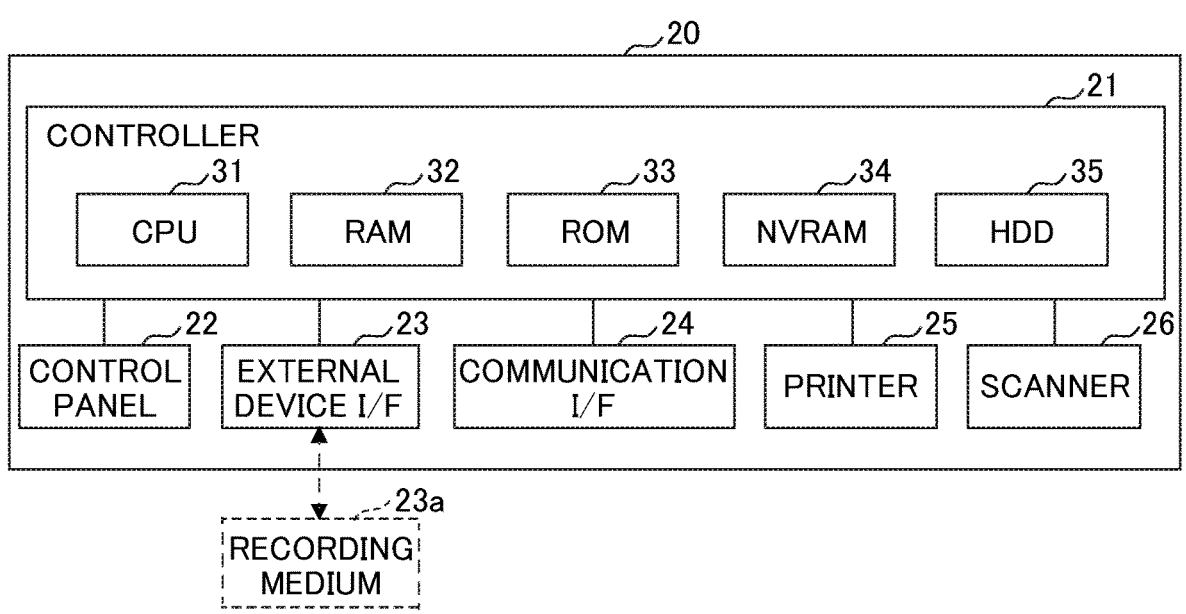
FIG. 3 is a diagram illustrating an example of a hardware configuration of a device according to an embodiment.

Next, a hardware configuration in a case where a device 20 included in the information processing system 1 according to the present embodiment is an image forming apparatus is explained, with reference to FIG. 3. FIG. 3 is a diagram illustrating an example of a hardware configuration of a device 20 according to the present embodiment.

The device 20 illustrated in FIG. 3 includes a controller 21, a control panel 22, an external device I/F 23, a communication I/F 24, a printer 25, and a scanner 26. Furthermore, the controller 21 includes a CPU 31, a RAM 32, a ROM 33, a non-volatile random access memory (NVRAM) 34, and an HDD 35.

The ROM 33 is a non-volatile semiconductor memory that stores various kinds of programs, data, etc. The RAM 32 is a volatile semiconductor memory that temporarily stores a program, data, etc. The NVRAM 34 stores, for example, setting information, etc. Furthermore, the HDD 35 is a non-volatile memory device storing various kinds of programs, data, etc.

The CPU 31 is an arithmetic device that retrieves a program or data from the ROM 33, the NVRAM 34, the HDD 35, etc., onto the RAM 32 for executing a process so as to achieve general control or a function of the device 20.

The control panel 22 includes an input unit to accept input from a user and a display unit to display. The external device I/F 23 is an interface to an external device. An external device may be a recording medium 23a, etc. Hence, the device 20 is capable of reading or writing from or onto the recording medium 23a via the external device I/F 23. Note that the recording medium 23a may be, for example, an integrated circuit (IC) card, a flexible disk, a CD, a DVD, an SD memory card, a USB memory, etc.

The communication I/F 24 is an interface circuit for connecting the device 20 to the network N1. Hence, the device 20 is capable of performing communication via the communication I/F 24. The printer 25 is a printing device for printing print data. The scanner 26 is a scanning device for scanning a document and generating an electronic file (i.e., an image file).

Having the hardware configuration illustrated in FIG. 3, it is possible that a device 20 according to the present embodiment achieves various processes as described below.

<Services Provided by the Service Providing System>

Here, a service provided by the service providing system 10 according to the present embodiment is explained. Note that, in the explanation below, it is assumed that a device 20 is an image forming apparatus.

In the present embodiment, a service for assigning a QR code (registered trademark) to an electronic file (i.e., an image file), which is generated by scanning a document using a device 20, and then printing the electronic file to which the QR code is assigned is referred to as a "QR code printing service". Further, in the present embodiment, a case in which the service providing system 10 provides the QR code printing service is explained.

In order for the service providing system 10 to provide the QR code printing service, it may be necessary to register, in the service providing system 10, an application (i.e., application information 1000 described below) for allowing a device 20 to utilize the QR code printing service.

Therefore, in the present embodiment, a case in which a PC terminal 30 registers an application for utilizing the QR code printing service and a case in which a device 20 utilizes the QR code printing service using the application are explained.

However, a service provided by the service providing system 10 is not limited to the QR code printing service. The service providing system 10 is able to provide various services, each of which is achieved by a series of processes with combination of one or more processes.

For example, the service providing system 10 is able to provide a mail delivering service of an electronic file, which is generated by scanning a document using a device 20, after encrypting the electronic file. Similarly, for example, the service providing system 10 is able to provide a facsimile transmission service of an electronic file, which is generated by scanning a document using a device 20, after adding predetermined information to the electronic file.

<Functional Configuration>

Figure 4:
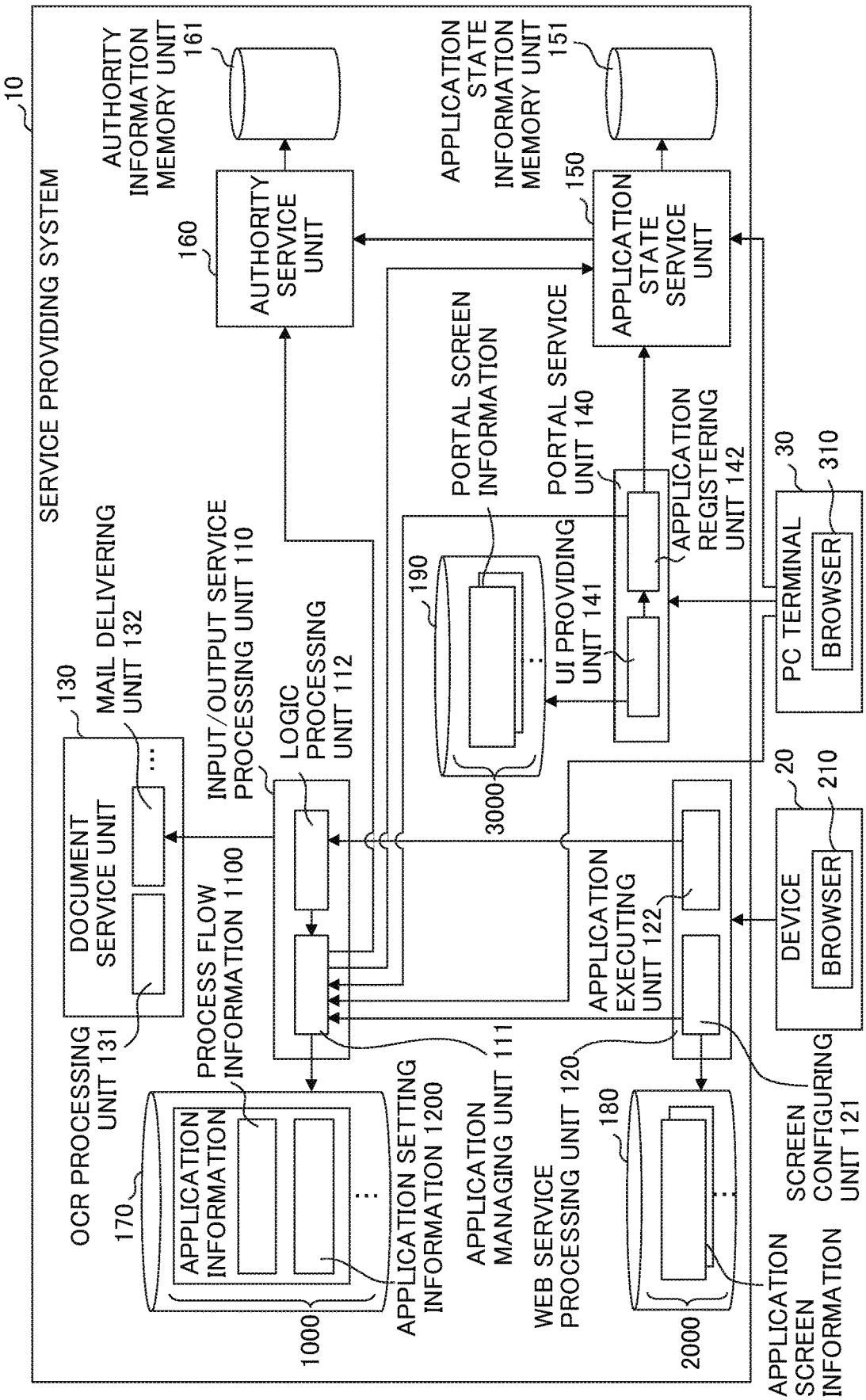
FIG. 4 is a diagram illustrating an example of a functional configuration of the information processing system according to an embodiment.

Next, with reference to FIG. 4, a functional configuration of the information processing system 1 according to the present embodiment is explained. FIG. 4 is a diagram illustrating an example of a functional configuration of the information processing system 1 according to the present embodiment.

The PC terminal 30 illustrated in FIG. 4 includes a browser 310, which is executed by the CPU 16, etc., for example. A user of the PC terminal 30 is able to use the browser 310 so as to register in the service providing system 10 an application for utilizing various kinds of services such as a "QR code printing service". Furthermore, a user of the PC terminal 30 is able to use the browser 310 so as to change various kinds of settings regarding an application registered in the service providing system 10 and to change a state (i.e., "application state" as described below) of the application.

The device 20 illustrated in FIG. 4 includes a browser 210, which is executed by the CPU 31, etc., for example. A user of the device 20 is able to use the browser 210 so as to utilize a service such as the "QR code printing service". The device 20 may only include the browser 210. For example, it is not necessary that the device 20 includes a dedicated application program, etc., for utilizing various kinds of services provided by the service providing system 10.

When a license is applied to an application registered in the service providing system 10, a user of the device 20 is able to utilize a service provided with use of the application.

Note that, for example, a license is applied to each unit called a "tenant", which is indicative of a group of people such as a company, a group, a department, a division, a section, or a team. Further, when a license is applied to a tenant, users who belong to the tenant become able to use an application. Application of a license to a tenant means that a tenant ID for identifying the tenant and an application ID for identifying an application available with the license are associated with each other. However, there is not such a limitation that a license is applied to each tenant. For example, a license may be applied to each user.

The service providing system 10 illustrated in FIG. 4 includes an input/output service processing unit 110, a web service processing unit 120, a document service unit 130, a portal service unit 140, an application state service unit 150, and an authority service unit 160. Each of the above function units is achieved when one or more programs installed in the service providing system 10 cause the CPU 16 to execute a process.

Furthermore, the service providing system 10 includes an application state information memory unit 151, an authority information memory unit 161, an application information memory unit 170, an application screen information memory unit 180, and a portal screen information memory unit 190. It is possible to achieve each of the above memory units, using the HDD 18. Note that at least one of the above memory units may be achieved by use of a memory device, etc., which is coupled with the service providing system 10 via a network.

The input/output service processing unit 110 performs a process regarding a service provided by the service providing system 10. The input/output service processing unit 110 includes an application managing unit 111 and a logic processing unit 112.

The application managing unit 111 manages application information 1000 stored in the application information memory unit 170. Application information 1000 is an application for utilizing a service achieved by a series of processes. In other words, each service provided by the service providing system 10 is provided with use of application information 1000.

Furthermore, in response to a request from the logic processing unit 112, the application managing unit 111 replies with process flow information 1100, which is included in application information 1000. Process flow information 1100 is information that defines a series of processes for achieving a service, which is provided with use of application information 1000.

Furthermore, in response to a request from the portal service unit 140, the application managing unit 111 stores application information 1000 in the application information memory unit 170. Hence, application information 1000 (i.e., an application) for providing a service is registered in the service providing system 10.

In response to a request from the web service processing unit 120, the logic processing unit 112 obtains process flow information 1100, which is included in application information 1000, from the application managing unit 111. Furthermore, based on the process flow information 1100 obtained from the application managing unit 111, the logic processing unit 112 executes a series of processes (i.e., a process flow) for achieving a service, which is provided by the application information 1000. Hence, it is possible that the information processing system 1 according to the present embodiment provides each service such as the "QR code printing service". Note that details of the logic processing unit 112 are described below.

The web service processing unit 120 performs a process for allowing a user to utilize each service by use of the browser 210 of a device 20. That is to say, the web service processing unit 120 functions as an application server that provides the browser 210 with a web application (i.e., application information 1000). The web service processing unit 120 includes a screen configuring unit 121 and an application executing unit 122.

In response to a request from the browser 210, the screen configuring unit 121 replies with application screen information 2000, which is stored in the application screen information memory unit 180, and application setting information 1200, which is included in application information 1000 stored in the application information memory unit 170.

Application screen information 2000 is information that defines a template of a screen (i.e., an application screen) for utilizing a service provided by an application (i.e., application information 1000). For example, application screen information 2000 is information that defines a template of an application screen by use of HyperText Markup Language (HTML), Extensible HyperText Markup Language (XHTML), Cascading Style Sheets (CSS), JavaScript (registered trademark), etc.

Furthermore, application setting information 1200 is information that defines various kinds of settings regarding an application (i.e., application information 1000). For example, application setting information 1200 defines parameter information that is input by a user, parameter information that is set as a default, etc., among from parameter information used for executing a series of processes. Furthermore, for example, application setting information 1200 defines an input item for a user to input parameter information on an application screen, display information (e.g., an application name) on an application screen, etc. For example, application setting information 1200 is information that defines various kinds of settings regarding an application by use of JavaScript Object Notation (JSON), etc.

Hence, the browser 210 of a device 20 displays an application screen for utilizing a service provided by the service providing system 10.

In response to a request from the browser 210, the application executing unit 122 transmits to the input/output service processing unit 110 a request for executing an application (i.e., application information 1000).

The document service unit 130 executes a predetermined process included in a series of processes (i.e., process flow) based on process flow information 1100. For example, the document service unit 130 includes an optical character recognition (OCR) processing unit 131, which performs an OCR process to an electronic file, and a mail delivering unit 132, which creates a mail to which an electronic file is attached and delivers the mail to a designated mail address.

Note that, in addition, for example, the document service unit 130 may include various function units such as a compression/decompression processing unit for compressing or decompression an electronic data and a data format converting unit.

The portal service unit 140 performs a process for allowing a user to use the browser 310 of a PC terminal 30 so as to register an application, etc. The portal service unit 140 includes a user interface (UI) providing unit 141 and an application registering unit 142.

In response to a request from the browser 310, the UI providing unit 141 replies with portal screen information 3000, which is stored in the portal screen information memory unit 190. A portal is a web site at which registration, etc., of an application is possible, using the browser 310.

Portal screen information 3000 is information that defines a top screen (i.e., a portal top screen) of a portal and various kinds of screens such as an application registration screen. Portal screen information 3000 is information that defines various kinds of screens by use of the browser 210 using HTML, Extensible Language (XML), CSS, or JavaScript, for example.

Hence, on a PC terminal 30, the browser 310 displays a portal top screen, an application registration screen, etc. Therefore, it is possible that a user of the PC terminal 30 performs a registration operation of an application (i.e., application information 1000) on the application registration screen.

In response to a request from the UI providing unit 141, the application registering unit 142 requests the application managing unit 111 to register an application (i.e., application information 1000). That is to say, when a registration operation of an application is performed on the application registration screen, the application registering unit 142 requests the application managing unit 111 to register an application.

Furthermore, when an application is registered, the application registering unit 142 requests the application state service unit 150 to register a state of the application (i.e., application state). Application state is indicative of whether an application is released, whether an application is available, etc. Further, as described below, for example, there are four states: "unreleased", "available", "temporarily suspended", and "prohibited from applying new license".

In response to a request from the application registering unit 142, the application state service unit 150 causes the application state information memory unit 151 to store application state information, which is indicative of a default application state of an application. Hence, an application state of an application (i.e., application information 1000) is registered in the service providing system 10. Note that a default application state may be, for example, "unreleased" that indicates that an application has not been released yet.

Furthermore, in response to a request from the browser 310 of a PC terminal 30, the application state service unit 150 changes an application state registered in the service providing system 10. When application state information, which is stored in the application state information memory unit 151, is updated, an application state is changed.

In response to a request from the application managing unit 111 or the application state service unit 150, the authority service unit 160 refers to the authority information memory unit 161 so as to check authority of a user of the PC terminal 30. Regarding authority, there may be three authorities: "administrator authority", "developer authority", and "general authority", for example. "Administrator authority" is, for example, authority granted to a user who manages the entirety of the service providing system 10 or manages each user, etc. "Developer authority" is, for example, authority granted to a developer of an application. "General authority" is, for example, authority granted to a user of an application.

The application state information memory unit 151 stores application state information. Here, application state information stored in the application state information memory unit 151 is explained, with reference to FIG. 5. FIG. 5 is a diagram illustrating an example of application state information.

As illustrated in FIG. 5, application state information includes such data items as "APPLICATION ID" and "APPLICATION STATE". As "APPLICATION ID", an application ID for identifying an application (i.e., application information 1000) is set. As "APPLICATION STATE", an application state that is indicative of a state of the application is set.

Regarding the application state, for example, there are four states: "unreleased", "available", "temporarily suspended", and "prohibited from applying new license". "Unreleased" is an application state indicating that an application has not been released yet. "Available" is an application state indicating that an application is on release and is available. "Temporarily suspended" is an application state indicating that an application is on release but the use is temporarily suspended. "Prohibited from applying new license" is a state prepared for abolition of an application and is an application state indicating that the application is available but application of a new license is prohibited.

Furthermore, "available" may be further divided into "available (not-editable)", which indicates that editing of an application is not allowed, and "available (editable)", which indicates that a user to whom "developer authority" is granted is able to edit an application. Similarly, "temporarily suspended" may be further divided into "temporarily suspended (not-editable)", which indicates that editing of an application is not possible, and "temporarily suspended (editable)", which indicates that a user to whom "developer authority" is granted is able to edit an application. However, "available" may not be able to be divided into "available (not-editable)" and "available (editable)". Similarly, "temporarily suspended" may not be able to be divided into "temporarily suspended (not-editable)" and "temporarily suspended (editable)".

Figure 6:
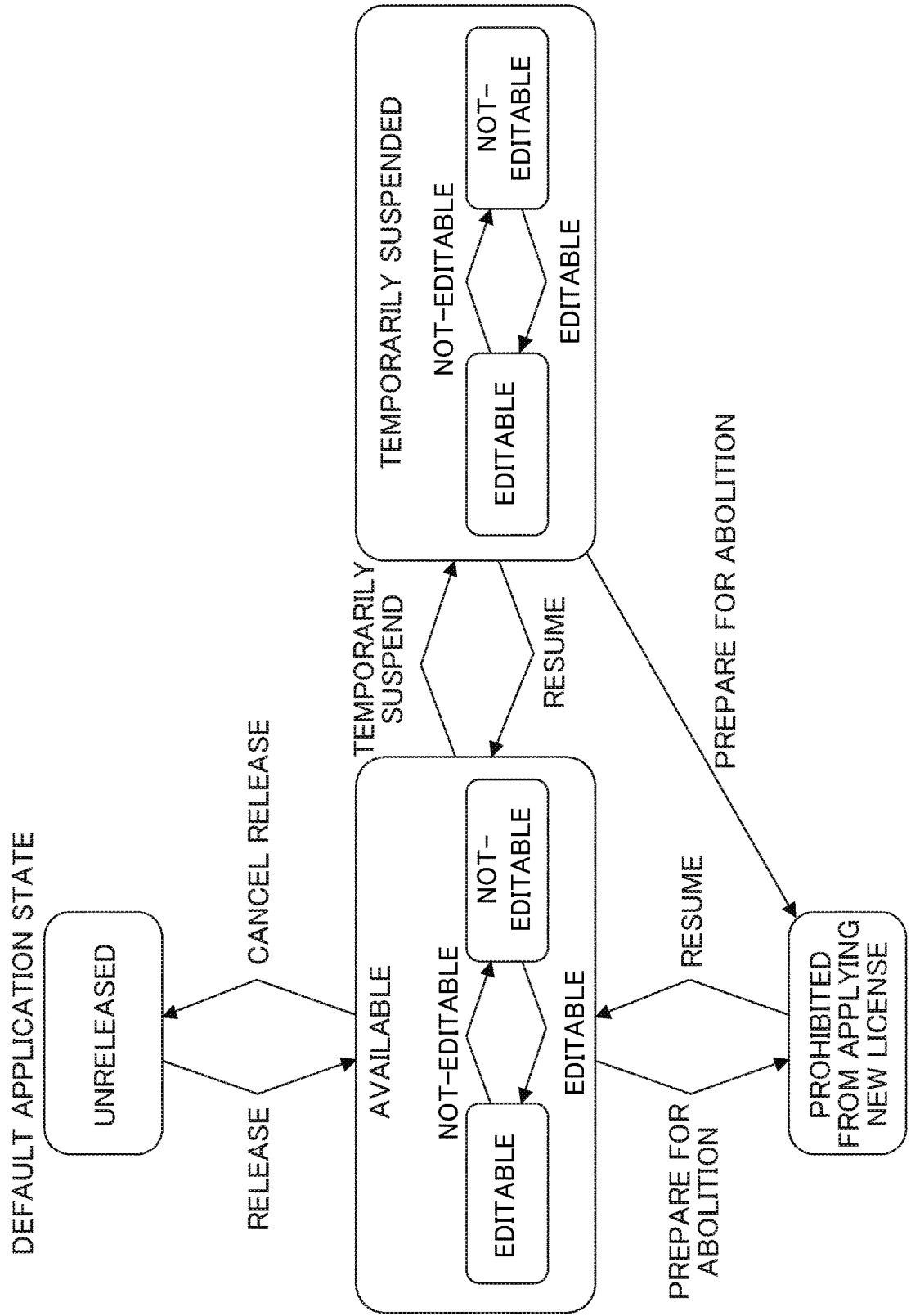
FIG. 6 is a diagram for schematically explaining transition between application states according to an embodiment.

Regarding an application, mutual transition of the above four application states (six application states in consideration of "editable" and "not-editable") is possible. Here, transition between the six application states in consideration of "editable" and "not-editable" is explained, with reference to FIG. 6. FIG. 6 is a diagram for schematically explaining transition between application states.

As illustrated in FIG. 6, the default application state of the application is "unreleased". When the application state is updated from "unreleased" to "available (editable)" or "available (not-editable)", the application is released, so as to enable a user of a device 20 to utilize the application. Contrarily, when the application state is updated from "available (editable)" or "available (not-editable)" to "released", release of the application is canceled, so as to disable a user of a device 20 to utilize the application.

Transition between the application states "available (editable)" and "available (not-editable)" is mutually possible. Hence, for example, it is possible to basically keep an application state "available (not-editable)" after being released and to temporarily change the application state into "available (editable)" in a case of a need for subtle modification to the application, so that editing the application becomes possible.

It is possible to temporarily suspend use of an application by updating an application state from "available (editable)" or "available (not-editable)" to "temporarily suspended (editable)" or "temporarily suspended (not-editable)". Hence, for example, in a case where a bug, etc., is found in an application after being released, it is possible to temporarily suspend use of the application by changing the application state to "temporarily suspended (editable)" so as to repair from the bug, etc.

Additionally, it is possible to resume use of an application by updating an application state from "temporarily suspended (editable)" or "temporarily suspended (not-editable)" to "available (editable)" or "available (not-editable)".

Transition between the application states "temporarily suspended (editable)" and "temporarily suspended (not-editable)" is mutually possible. Note that, in a case where an application state of an application is "temporarily suspended", a user of a device 20 is not able to utilize the application. Therefore, there may be only "temporarily suspended (editable)", without dividing into "temporarily suspended (editable)" and "temporarily suspended (not-editable)".

It is possible to prepare for abolition of an application by updating an application state from "available (editable)", "available (not-editable)", "temporarily suspended (editable)", or "temporarily suspended (not-editable)" to "prohibited from applying new license". Hence, for example, when abolition of an application is projected, it is possible to prohibit a license of the application from being newly applied.

Contrarily, it is possible to resume new application of a license of an application by updating an application state from "prohibited from applying new license" to "available (editable)" or "available (not-editable)". Hence, for example, when abolition of an application is projected but the project is canceled, it is possible to resume new application of a license of the application.

As described above, regarding an application registered in the service providing system 10, transition among six application states is possible. Note that an application state of an application registered in the service providing system 10 is not limited to one of the above six application states. An application state of an application registered in the service providing system 10 may include, for example, "suspension of use", etc., which disables all users who have installed the application to use the application.

The authority information memory unit 161 stores authority information. Here, application state information stored in the authority information memory unit 161 is explained, with reference to FIG. 7. FIG. 7 is a diagram illustrating an example of authority information.

As illustrated in FIG. 7, authority information includes such data items as "USER ID" and "AUTHORITY". As "USER ID", a user ID for identifying a user of a device 20 or a PC terminal 30 is set. As "AUTHORITY", authority of the user is set. Regarding authority, as described above, there may be three authorities: "administrator authority", "developer authority", and "general authority", for example.

The application information memory unit 170 stores application information 1000. Application information 1000 is stored in the application information memory unit 170 in an associated manner with an application ID for identifying the application information 1000. An application ID is, for example, a Uniform Resource Locator (URL) of application information 1000 or identification information included in a URL of application information 1000, etc.

Here, application information 1000 includes process flow information 1100 and application setting information 1200. For example, application information 1000 for providing a QR code printing service includes process flow information 1100, which defines a series of processes for achieving the service, and application setting information 1200, which defines various kinds of settings of the application information 1000. In the following description, the application information 1000 for providing the QR code printing service is also referred to as "QR code printing application".

Note that application information 1000 may include two or more process flow information 1100 and two or more application setting information 1200.

As described above, process flow information 1100 is information that defines a series of processes (i.e., a process flow) for achieving a service, which is provided with use of application information 1000. Note that details of process flow information 1100 are described below.

Furthermore, as described above, application setting information 1200 is information that defines various kinds of settings regarding an application (i.e., application information 1000). Note that details of application setting information 1200 are described below.

The application screen information memory unit 180 stores application screen information 2000. Application screen information 2000 includes application screen information 2000 of an application list screen, which is for displaying a list of applications to which licenses are applied, and application screen information 2000 of an application utilizing screen, which is for utilizing an application selected on the application list screen.

The portal screen information memory unit 190 stores portal screen information 3000. Portal screen information 3000 is stored in the portal screen information memory unit 190 in an associated manner with an URL of a portal top screen, application registration screen, etc.

Note that each of the input/output service processing unit 110, the web service processing unit 120, the document service unit 130, the portal service unit 140, the application state service unit 150, and the authority service unit 160 may be implemented in different information processing apparatuses.

Figure 8:
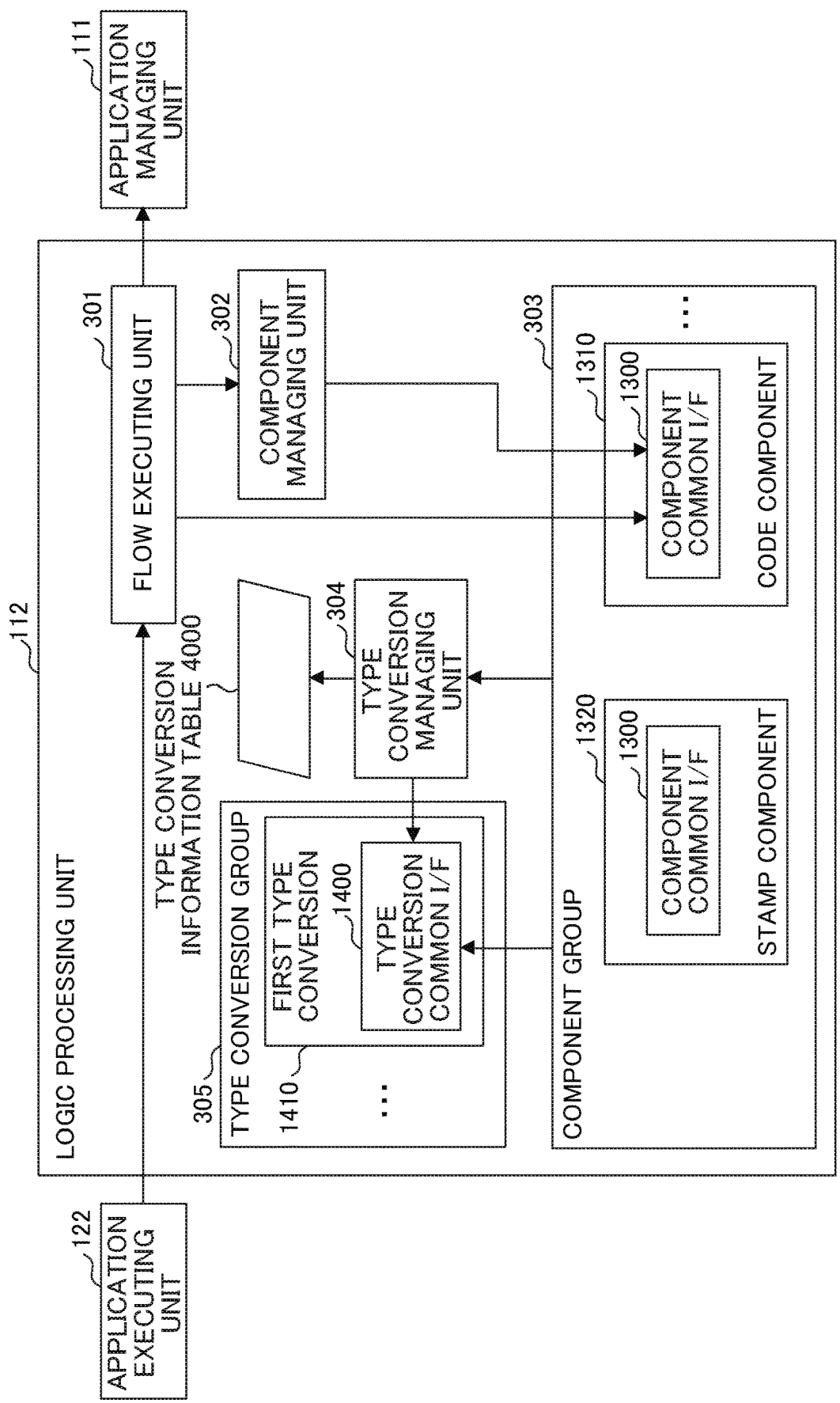
FIG. 8 is a diagram illustrating an example of a functional configuration of a logic processing unit according to an embodiment.

Here, a detailed functional configuration of the logic processing unit 112 are explained, with reference to FIG. 8. FIG. 8 is a diagram illustrating an example of a functional configuration of the logic processing unit 112 according to the present embodiment.

The logic processing unit 112 illustrated in FIG. 8 includes a flow executing unit 301, a component managing unit 302, a component group 303, a type conversion managing unit 304, and a type conversion group 305. Furthermore, the logic processing unit 112 includes a type conversion information table 4000.

Upon receiving an application executing request from the application executing unit 122, the flow executing unit 301 obtains from the application managing unit 111 process flow information 1100 corresponding to the executing request. Furthermore, the flow executing unit 301 executes a series of processes (i.e., a process flow) based on the process flow information 1100 obtained from the application managing unit 111.

Here, the series of processes based on the process flow information 1100 are executed by combining a component for executing each process included in the series of processes. Note that a component is realized by a program, a module, etc., for executing a process to achieve a predetermined function and is defined by a class, a function, etc., for example.

The component managing unit 302 manages a component. In response to a request from the flow executing unit 301, the component managing unit 302 generates a component and replies to the flow executing unit 301 with the generated component. Note that generation of a component means, for example, that a component defined by a class, a function, etc., is expanded in a memory (e.g., the RAM 14).

The component group 303 is a group of components. The component group 303 includes, for example, a code component 1310 and a stamp component 1320.

A code component 1310 is a component for generating a QR code in which information (e.g., a text) designated as a parameter is embedded. Note that there is not such a limitation that a code component 1310 generates a QR code and, for example, a code component 1310 may generate various types of codes such as a barcode.

A stamp component 1320 is, for example, a component for superimposing a code such as a QR code on an electronic file such as an image file or a Portable Document Format (PDF) file.

As described above, each component executes a process for achieving a predetermined function. Note that, in addition to the above component, the component group 303 includes various kinds of components such as an encryption/ decryption component for encrypting or decrypting an electronic file, a compression component for compression an electronic file, for example.

Furthermore, each component included in the component group 303 includes a component common I/F 1300. The component common I/F 1300 is an application programming interface (API) commonly defined for each component and includes an API for generating a component and an API for executing a process of a component.

As each component includes the component common I/F 1300, it is possible to localize an influence associated with addition, etc., of a component. That is to say, for example, it is possible to perform addition, etc., of a component, without having an influence to the flow executing unit 301, the component managing unit 302, etc. Hence, in the service providing system 10 according to the present embodiment, it is possible to decrease the number of steps for development associated with addition, etc., of a predetermined function (i.e., addition, etc., of a component for executing a process for achieving the function).

The type conversion managing unit 304 manages a type conversion for a data type. A data type that each component is able to deal with is predetermined. Therefore, in response to a request from a component, the type conversion managing unit 304 refers to the type conversion information table 4000 illustrated in FIG. 9, for example, and generates a type conversion included in the type conversion group 305.

Furthermore, the type conversion managing unit 304 requests the generated type conversion to execute a type conversion process. Note that a type conversion is realized by a program, a module, etc., for executing a type conversion process for a data type and is defined by a class, a function, etc., for example. Furthermore, generation of a type conversion means, for example, that a type conversion defined by a class, a function, etc., is expanded in a memory (e.g., in the RAM 14).

Examples of a data type include "InputStream", which is a data type indicative of stream data, "LocalFilePath", which is indicative of a path (i.e., an address) of an electronic file stored in a memory device, etc., "File", which is indicative of an entity of an electronic file, etc.

Here, the type conversion information table 4000 is explained, with reference to FIG. 9. FIG. 9 is a diagram illustrating an example of a type conversion information table.

The type conversion information table 4000 illustrated in FIG. 9 includes such data items as "DATA TYPE BEFORE CONVERSION", DATA TYPE AFTER CONVERSION", and "TYPE CONVERSION TO BE GENERATED". That is to say, type conversion information stored in the type conversion information table 4000 is information in which each set of a data type before conversion and a data type after conversion is associated with a type conversion for converting the data type before conversion into the data type after conversion.

The type conversion group 305 is a group of type conversions. The type conversion group 305 includes a first type conversion 1410 for converting data type "InputStream" into "LocalFilePath". Additionally, the type conversion group 305 includes, for example, a second type conversion for converting data type "LocalFilePath" into "File".

Furthermore, each type conversion included in the type conversion group 305 includes a type conversion common I/F 1400. The type conversion common I/F 1400 is an API commonly defined for each type conversion and includes an API for generating a type conversion and an API for executing a type conversion process of a type conversion.

As each type conversion includes the type conversion common I/F 1400, it is possible to localize an influence associated with addition, etc., of a type conversion. That is to say, for example, it is possible to perform addition, etc., of a type conversion, without having an influence to the type conversion managing unit 304, etc. Hence, in the service providing system 10 according to the present embodiment, it is possible to decrease the number of steps for development associated with addition, etc., of a type conversion.

Figure 10:
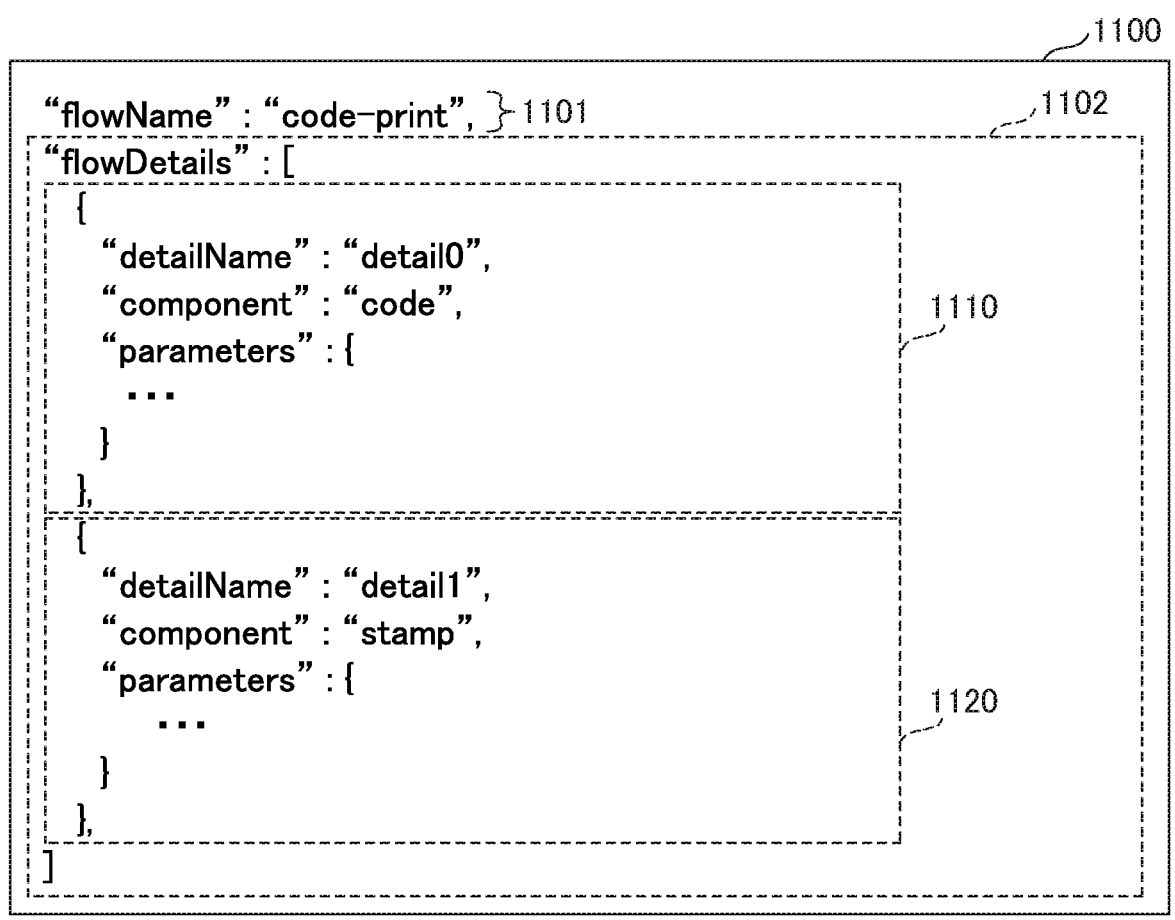
FIG. 10 is a diagram illustrating an example of process flow information according to an embodiment.

Here, process flow information 1100 included in the application information 1000 for providing a QR code printing service is explained, with reference to FIG. 10. FIG. 10 is a diagram illustrating an example of process flow information 1100.

Process flow information 1100 illustrated in FIG. 10 is information that defines a series of processes (i.e., a process flow) for achieving a QR code printing service.

The process flow information 1100 illustrated in FIG. 10 includes a flow name 1101 for identifying the process flow information 1100 and flow details 1102 that defines a processing content of each process included in a process flow.

The flow name 1101 includes "flowName" that defines a flow name. In "flowName" of the process flow information 1100 illustrated in FIG. 10, a flow name of a series of processes "code-print" for achieving a QR code printing service is defined.

The flow details 1102 include detail process definitions 1110 through 1120, in which processes included in a process flow are defined, respectively. Each of the detail process definitions 1110 through 1120 includes "detailName" in which a detail process name for identifying a detail process definition is defined. Furthermore, each of the detail process definitions 1110 through 1120 includes "component", in which a component name of a component for executing a process is defined, and "parameters", in which parameter information corresponding to the component is defined. As described above, the component may be a program carrying out a specific process, and a component name (or any identifier) for identifying the component may be stored as the process flow information 1100.

In "detailName" of the detail process definition 1110, "detail0" is defined. Furthermore, in "component" of the detail process definition 1110, component name of the code component 1310 "code" is defined. Furthermore, in "parameters" of the detail process definition 1110, various kinds of parameter information corresponding to the code component 1310 are defined.

Similarly, in "detailName" of the detail process definition 1120, "detail1" is defined. Furthermore, in "component" of the detail process definition 1120, component name of the stamp component 1320 "stamp" is defined. Furthermore, in "parameters" of the detail process definition 1120, various kinds of parameter information corresponding to the stamp component 1320 are defined.

Note that the execution order of a process defined in each detail process definition is defined so as to start from the top in the flow details 1102. That is to say, the series of processes (i.e., a process flow) based on the process flow information 1100 illustrated in FIG. 10 is executed in an order of a process defined in the detail process definition 1110 and then a process defined in the detail process definition 1120. However, there is not such limitation as above. For example, in process flow information 1100, information indicative of an execution order of a process defined in each detail process definition may be defined.

<Processing Details>

Next, processing details of the information processing system 1 according to the present embodiment are explained.

<<Registration of Application>>

Figure 11:
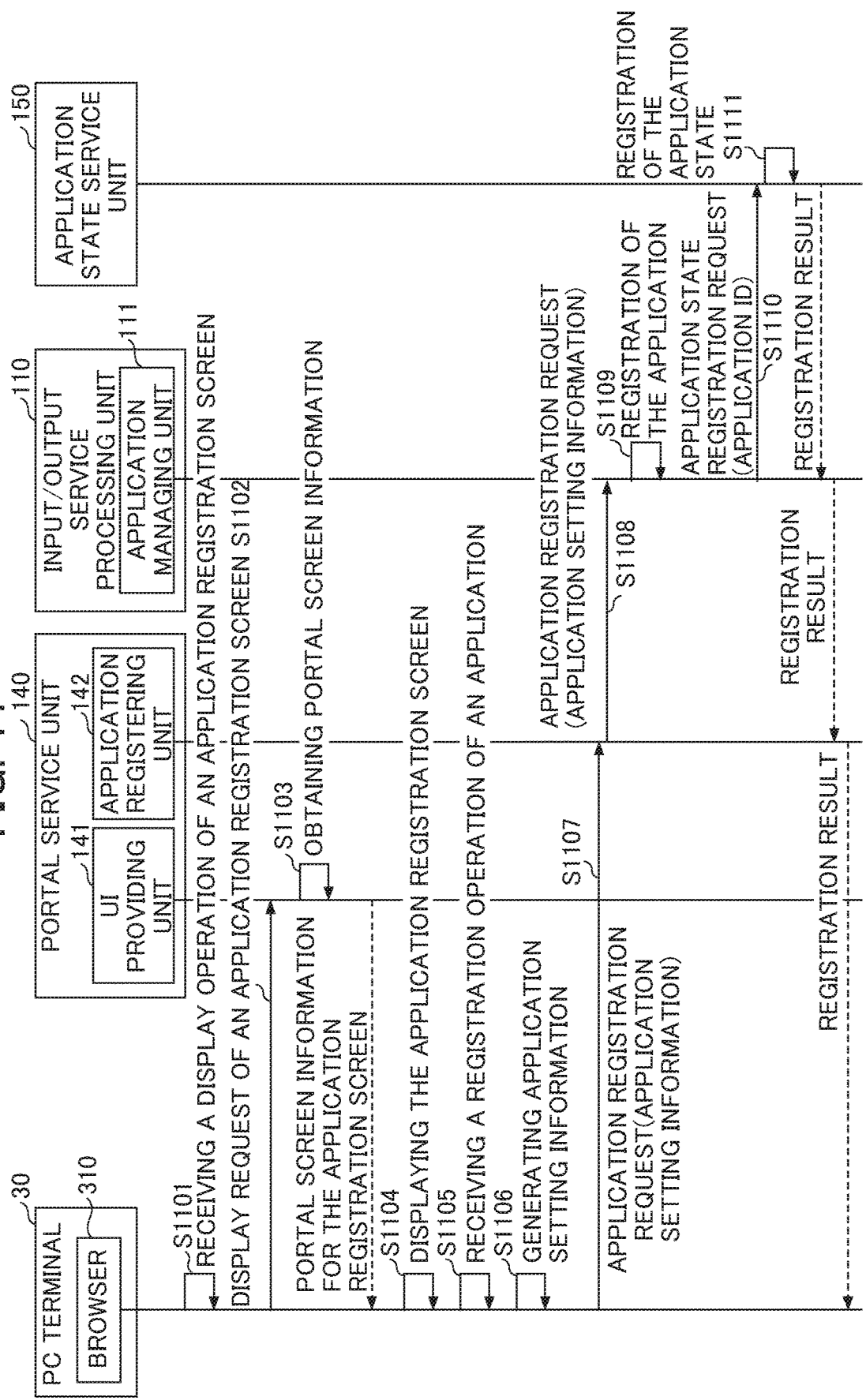
FIG. 11 is a sequence diagram illustrating an example of a process of registering an application according to an embodiment.

In the following description, a process in which a user of a PC terminal 30 registers a QR code printing application in the service providing system 10 is explained, with reference to FIG. 11. FIG. 11 is a sequence diagram illustrating an example of a process of registering an application.

First, the browser 310 of a PC terminal 30 receives an operation (i.e., a display operation of an application registration screen) for displaying an application registration screen (Step S1101). Note that a user of the PC terminal 30 is able to perform a display operation of the application registration screen by, for example, pressing a link button to the application registration screen or the like on a portal top screen.

Upon receiving the display operation of the application registration screen, the browser 310 of the PC terminal 30 transmits a display request of the application registration screen to the UI providing unit 141 of the portal service unit 140 (Step S1102).

Upon receiving the display request of the application registration screen, the UI providing unit 141 of the portal service unit 140 obtains portal screen information 3000 for the application registration screen from the portal screen information memory unit 190 (Step S1103). That is to say, the UI providing unit 141 obtains from the portal screen information memory unit 190 portal screen information 3000 for displaying application registration screens G100 through G400 described below.

Then, the UI providing unit 141 replies to the browser 310 with the portal screen information 3000 obtained from the portal screen information memory unit 190.

Figure 12:
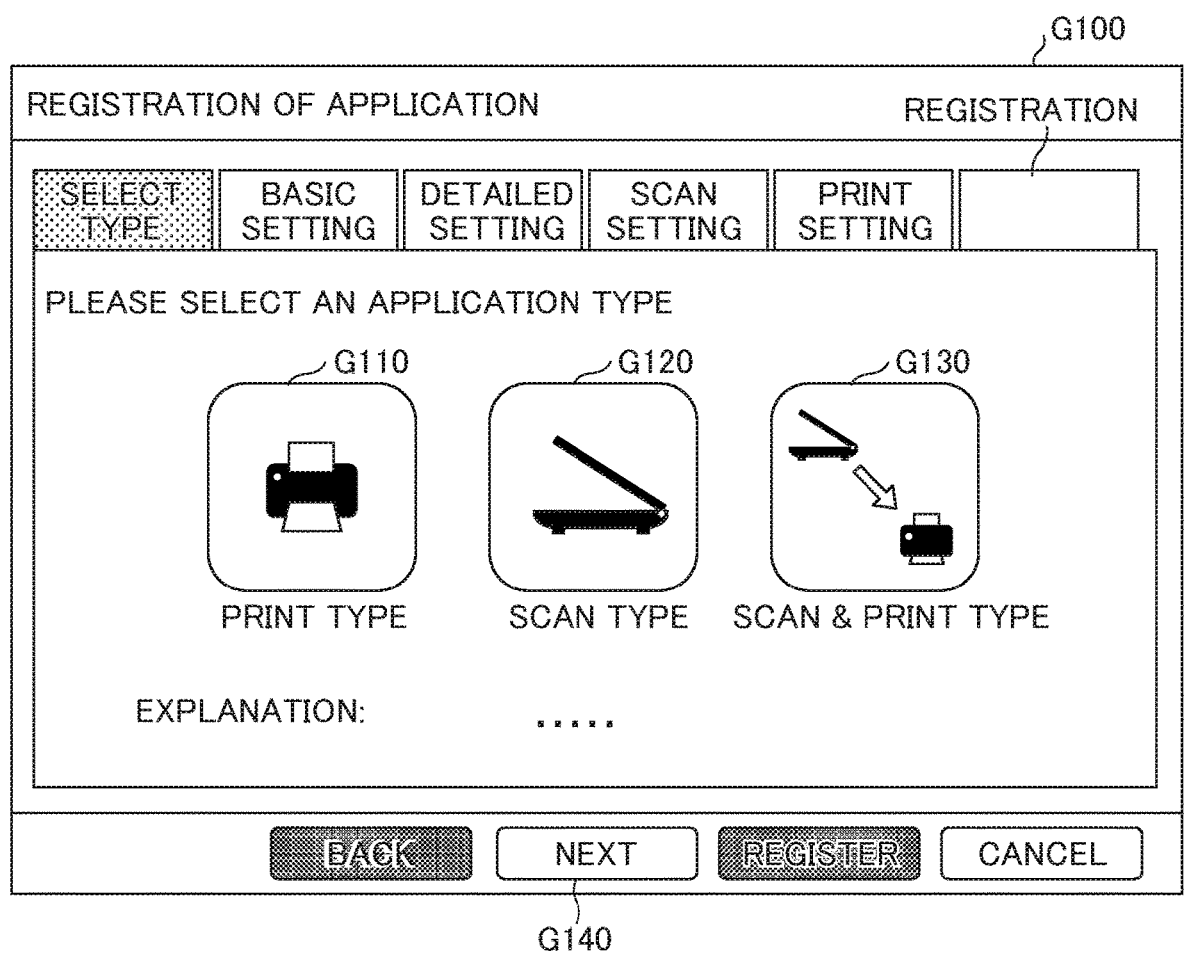
FIG. 12 is a diagram illustrating an example of an application registration screen (1/4) according to an embodiment.

Upon receiving the portal screen information 3000 for the application registration screen, the browser 310 of the PC terminal 30 displays, for example, the application registration screen G100 illustrated in FIG. 12, based on the portal screen information 3000 (Step S1104).

Here, in the following description, a case in which a user performs a registration operation of an application is described, with reference to FIGS. 12 through 15.

The application registration screen G100 illustrated in FIG. 12 includes a "print" button G110 for registering a print type application and a "scan" button G120 for registering a scan type application. Furthermore, the application registration screen G100 illustrated in FIG. 12 includes a "scan & print" button G130 for registering a scan and print type application.

A print type application is a type of application that causes an image forming apparatus or the like to print an electronic file indicative of an execution result of a series of processes. Furthermore, the scan type application is a type of application that executes a series of processes in an image forming apparatus or the like with an input of an electronic file generated by scanning. Further, the scan and print type application is a type of application that executes a series of processes in an image forming apparatus or the like with an input of an electronic file generated by scanning and causes an image forming apparatus or the like to print an electronic file indicative of the execution result.

When a user selects the "scan & print" button G130 on the application registration screen G100 illustrated in FIG. 12 and then performs an operation of pressing a "NEXT" button G140, screen transition to one of various screens for registering a scan and print type application occurs. Such various screens include an application registration screen G200 illustrated in FIG. 13 and an application registration screen G300 illustrated in FIG. 14.

The application registration screen G200 illustrated in FIG. 13 is a screen for setting a default value of a scan setting (e.g., "SHEET ORIENTATION", "SINGLE SIDE/DOUBLE SIDE", etc.). A user is able to set a default value of each scan setting in a default value setting field G210.

Furthermore, a user is able to set, in a setting availability field G220, whether to permit a change of scan settings when using an application. Regarding a scan setting with a check in the setting availability field G220, it is possible to change a setting value when using the application. Contrarily, regarding a scan setting without a check in the setting availability field G220, it is not possible to change a setting value when using the application. Therefore, by not checking the setting availability field G220, a user is able to designate an application-specific setting value as a default value for the unchecked scan setting.

The application registration screen G300 illustrated in FIG. 14 is a screen for setting a default value of a print setting (e.g., "NUMBER OF COPIES", "PRINT COLOR MODE", etc.). A user is able to set a default value of each print setting in a default value setting field G310.

Furthermore, a user is able to set, in a setting availability field G320, whether to permit a change of print settings when using an application. Regarding a print setting with a check in the setting availability field G320, it is possible to change a setting value when using the application. Contrarily, regarding a print setting without a check in the setting availability field G320, it is not possible to change a setting value when using the application. Therefore, as in the case of scan settings, by not checking the setting availability field G320, a user is able to designate an application-specific setting value as a default value for the unchecked print setting.

Note that, in addition to scan settings and print settings, a user is able to perform basic settings and detailed settings. In basic settings, setting of an application name, a display language, etc., is possible. In detailed settings, it is possible to select a process flow for realizing an application and to set parameter information, etc., of the process flow.

When a basic setting, a detailed setting, a scan setting, or a print setting is performed, the application registration screen G400 illustrated in FIG. 15 is displayed, for example. The application registration screen G400 illustrated in FIG. 15 includes a confirmation field G410 in which contents of basic settings, detailed settings, scan settings, and print settings are displayed. By referring to the confirmation field G410, it is possible for a user to check contents of basic setting, detailed setting, scan settings, and print settings.

Here, it is assumed that a user confirms the confirmation field G410 and then performs an operation (i.e., a registration operation of an application) of pressing the "REGISTER" button G420. As a result, the browser 310 receives a registration operation of the application (Step S1105).

Upon receiving the registration operation of the application, the browser 310 of the PC terminal 30 generates the application setting information 1200 illustrated in FIG. 16, for example (Step S1106). FIG. 16 is a diagram illustrating an example of application setting information 1200.

The application setting information 1200 illustrated in FIG. 16 includes an application type 1201 in which "scan&print" indicative of being a scan and print type is set. Furthermore, the application setting information 1200 illustrated in FIG. 16 includes a flow name 1202 in which a flow name "code-print" of processing flow information 1100 defining a series of processes for realizing an application is set. Furthermore, the application setting information 1200 illustrated in FIG. 16 includes a scan setting default parameter 1203 and a print setting default parameter 1204.

In the scan setting default parameter 1203, a parameter indicative of a default value of a scan setting, which has been set on the application registration screen G200 illustrated in FIG. 13, is set. Furthermore, in the print setting default parameter 1204, a parameter indicative of a default value of a print setting, which has been set on the application registration screen G300 illustrated in FIG. 14, is set. Hence, regarding an application registered by a user, it is possible to use the scan setting default parameter 1203 and the print setting default parameter 1204 as a default value of a scan setting and a default value of a print setting, respectively.

Following Step S1106, the browser 310 of the PC terminal 30 transmits an application registration request to the application registering unit 142 of the portal service unit 140 (Step S1107). The application registration request includes the application setting information 1200 generated in the above Step S1106.

Upon receiving the application registration request, the application registering unit 142 of the portal service unit 140 transmits the registration request to the application managing unit 111 of the input/output service processing unit 110 (Step S1108).

Upon receiving the application registration request, the application managing unit 111 of the input/output service processing unit 110 registers the application (Step S1109). That is to say, the application managing unit 111 stores, in the application information memory unit 170, the application setting information 1200 included in the application registration request in an associated manner with an application ID. Hence, application information 1000 including the application setting information 1200 and the process flow information 1100 of the flow name set in the flow name 1202 of the application setting information 1200 is registered in the service providing system 10.

Next, the application registering unit 142 of the portal service unit 140 transmits an application state registration request to the application state service unit 150 (Step S1110). The application state registration request includes the application ID of the application information 1000 registered in the above Step S1109.

Upon receiving the application state registration request, the application state service unit 150 generates application state information, in which the application ID included in the registration request and a default application state (e.g., "unreleased") are associated with each other, and stores application state information in the application state information memory unit 151 (Step S1111). Hence, the default application state of the application registered in the above Step S1109 is registered in the service providing system 10.

Then, the application state service unit 150 replies the application managing unit 111 of the input/output service processing unit 110 with the registration result.

As described above, in the information processing system 1 according to the present embodiment, a user is able to register an application in the service providing system 10 using a PC terminal 30. Moreover, in the information processing system 1 according to the present embodiment, it is possible that a user sets a default value, etc., of, for example, a flow name, a scan setting, a print setting, or the like, using a PC terminal 30, so as to easily register an application (i.e., application information 1000).

Therefore, the information processing system 1 according to the present embodiment enables, for example, even a user (e.g., a person in charge of planning) who does not have expert knowledge or experience such as a programming language or the like to register an application (i.e., application information 1000) for providing one of various services.

<<Change of Application State>>

Figure 17:
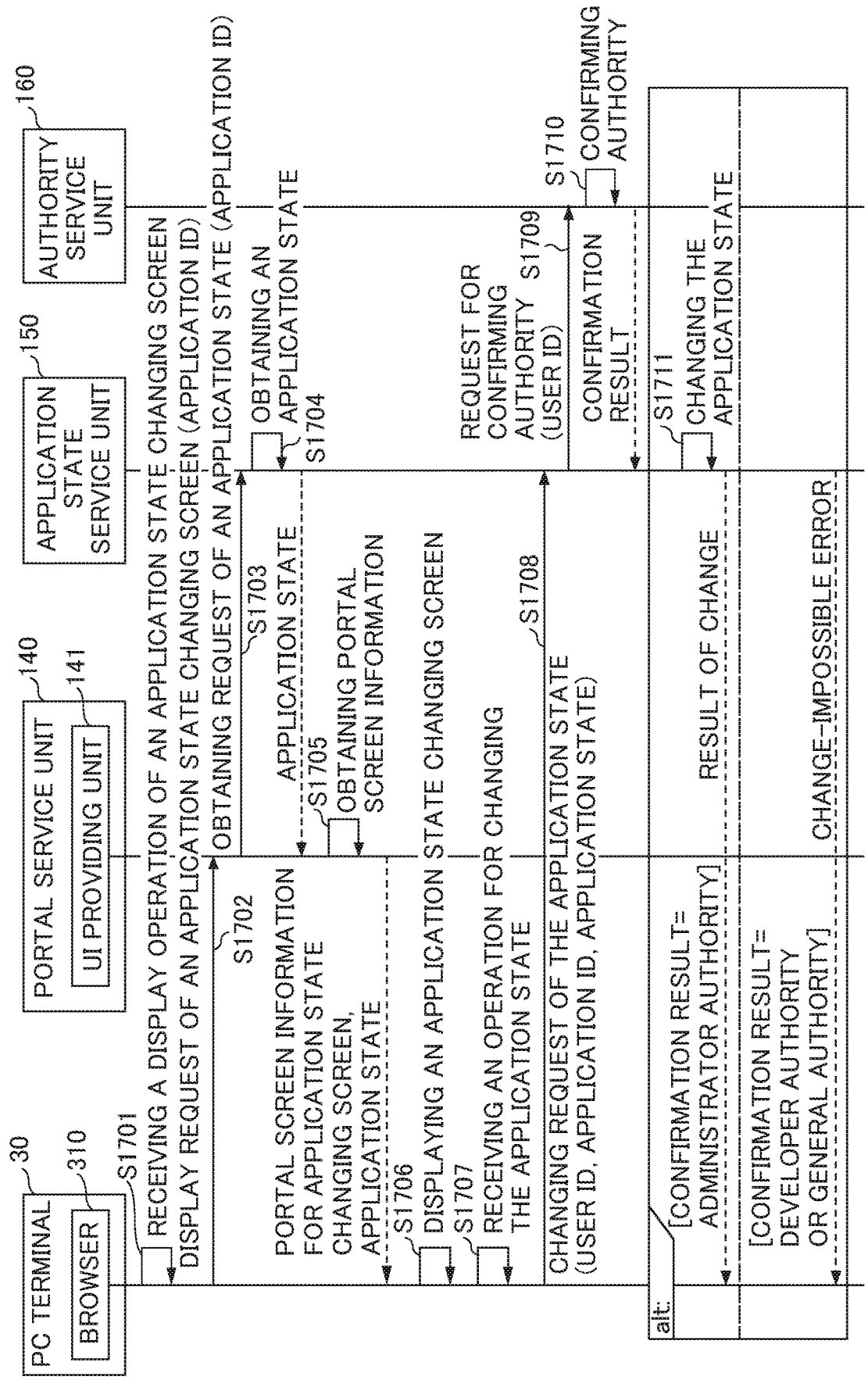
FIG. 17 is a sequence diagram illustrating an example of a process of changing an application state according to an embodiment.

In the following description, a process of changing an application state of an application registered in the service providing system 10 is explained, with reference to FIG. 17. FIG. 17 is a sequence diagram illustrating an example of a process of changing an application state.

First, the browser 310 of a PC terminal 30 receives an operation (i.e., a display operation of an application state changing screen) for displaying an application state changing screen (Step S1701). Note that a user of the PC terminal 30 designates on a portal top screen, for example, an application that the user desires to change an application state and then presses a link button to an application state changing screen or the like, so as to perform a display operation of the application state changing screen.

Upon receiving the display operation of an application state changing screen, the browser 310 of the PC terminal 30 transmits a display request of the application state changing screen to the UI providing unit 141 of the portal service unit 140 (Step S1702). The display request of the application state changing screen includes the application ID of an application designated by a user.

Upon receiving the display request of the application state changing screen, the UI providing unit 141 of the portal service unit 140 transmits an application state obtaining request to the application state service unit 150 (Step S1703). The application state obtaining request includes the above application ID.

Upon receiving the application state obtaining request, the application state service unit 150 obtains from the application state information memory unit 151 the application state associated with the application ID included in the obtaining request (Step S1704). Then, the application state service unit 150 replies the UI providing unit 141 with the obtained application state. Hence, the reply includes the current application state of the application designated by a user.

When the application state service unit 150 replies with the application state, the UI providing unit 141 of the portal service unit 140 obtains portal screen information 3000 for the application state changing screen from portal screen information memory unit 190 (Step S1705).

Then, the UI providing unit 141 replies to the browser 310 with the portal screen information 3000 obtained from the portal screen information memory unit 190.

Upon receiving the portal screen information 3000 for the application state changing screen and the application state, the browser 310 of the PC terminal 30 displays, for example, an application state changing screen G500 illustrated in FIG. 18, based on the portal screen information 3000 and the application state (Step S1706).

The application state changing screen G500 illustrated in FIG. 18 is a screen for changing an application state and includes a "CHANGE APPLICATION STATE" button G510. When a user presses the "CHANGE APPLICATION STATUS" button G510, an application state list G520 is displayed. A user is able to perform an operation for changing an application state by selecting a desired application state from the application state list G520 and pressing an OK button G530. Note that, in the example illustrated in FIG. 18, the current application state, which is "UNRELEASED", is grayed out such that it is not possible to select "UNRELEASED" in the application state list G520.

Here, in a case where an application may become in an application state that may be "editable" or "not-editable", the browser 310 may display an application state changing screen G600 illustrated in FIG. 19 in the above Step S1706.

The application state changing screen G600 illustrated in FIG. 19 includes an "EDIT-AVAILABILITY" button G610, comparing with the application state changing screen G500 illustrated in FIG. 18. In the case where the current application state is "available (editable)", "available (not-editable)", "temporarily suspended (editable)" or "temporarily suspended (not-editable)", a user may press the "EDIT-AVAILABILITY" button G610. When a user presses the "EDIT-AVAILABILITY" button G610, an edit-availability list G620 is displayed. A user is able to perform an operation for changing an application state by selecting "editable" or "not-editable" from the edit-availability list G620 and pressing the OK button G630. Note that, in the example illustrated in FIG. 19, the current application state, which is "available (not-editable)", is grayed out such that it is not possible to select "not-editable" in the edit-availability list G620.

Following Step S1706, the browser 310 of the PC terminal 30 receives an operation for changing an application state (Step S1707).

Upon receiving the operation for changing an application state, the browser 310 of the PC terminal 30 transmits a request for changing an application state to the application state service unit 150 (Step S1708). The request for changing an application state includes the user ID of a user who performed the operation for changing an application state, the application ID of a changing-target application, and an application state after changing.

Upon receiving the request for changing an application state, the application state service unit 150 transmits a request for confirming authority to the authority service unit 160 (Step S1709). The request for confirming authority includes the user ID described above.

Upon receiving the request for confirming authority, the authority service unit 160 refers to the authority information memory unit 161 and confirms the authority associated with the user ID included in the confirmation request (Step S1710). Then, the authority service unit 160 replies to the application state service unit 150 with a confirmation result indicative of the confirmed authority.

In a case where the reply is with a confirmation result indicative of "administrator authority", the application state service unit 150 changes an application state (Step S1711). That is to say, among the application states stored in the application state information memory unit 151, the application state service unit 150 updates an application state of application state information including the application ID to the changed application state. As a result, the application state of the application is changed.

Then, the application state service unit 150 replies to the browser 310 of the PC terminal 30 with a change result, which indicates that the application state has been changed.

Contrarily, in a case where the reply is with a confirmation result indicative of "DEVELOPER AUTHORITY" or "GENERAL AUTHORITY", the application state service unit 150 replies to the browser 310 of the PC terminal 30 with a change-impossible error, which indicates that it is not possible to change the application state. As described above, in a case where the authority of a user of the PC terminal 30 is "DEVELOPER AUTHORITY" or "GENERAL AUTHORITY", the application state service unit 150 does not permit change of an application state.

As described above, in the information processing system 1 according to the present embodiment, it is possible for a user to whom administrator authority is granted to use a PC terminal 30 for changing an application state of an application registered in the service providing system 10.

In a case of changing an application state, an application registered in the service providing system 10 may be released, for example. In this case, for example, the application state may be changed from "UNRELEASED" to "AVAILABLE (IMPOSSIBLE TO EDIT)". As a result, a user of the device 20 is able to use the application.

Further, for example, there may be a case where a minor modification is made to a released application. In this case, the application state may be changed from "AVAILABLE (IMPOSSIBLE TO EDIT)" to "AVAILABLE (POSSIBLE TO EDIT)", for example. As a result, it is possible for a user to whom a developer authority is granted to edit the application while allowing a user of a device 20 to use the application.

Further, for example, there may be a case where a bug or a problem (e.g., a problem relating to security, a legal problem such as copyright etc.) is found in a released application and it is necessary to conduct a survey, correction, etc. In this case, for example, the application state may be changed from "AVAILABLE (POSSIBLE TO EDIT)" (or "AVAILABLE (IMPOSSIBLE TO EDIT)") to "TEMPORARILY SUSPENDED (POSSIBLE TO EDIT)". As a result, it is possible for a user to whom developer authority is granted to edit the application while temporarily suspending usage of the application by a user of a device 20.

Note that, in FIG. 17, only a user to whom the administrator authority is granted is permitted to change the application state, but the present invention is not limited thereto. For example, in addition to the user to whom the administrator authority is granted, a user to whom developer authority is granted may be permitted to change the application state as well. Alternatively, for example, permission of changing an application state may be limited to only a user to whom special authority (e.g., application state changing authority) for changing an application state is.

<<Change of an Application State>>

Figure 20:
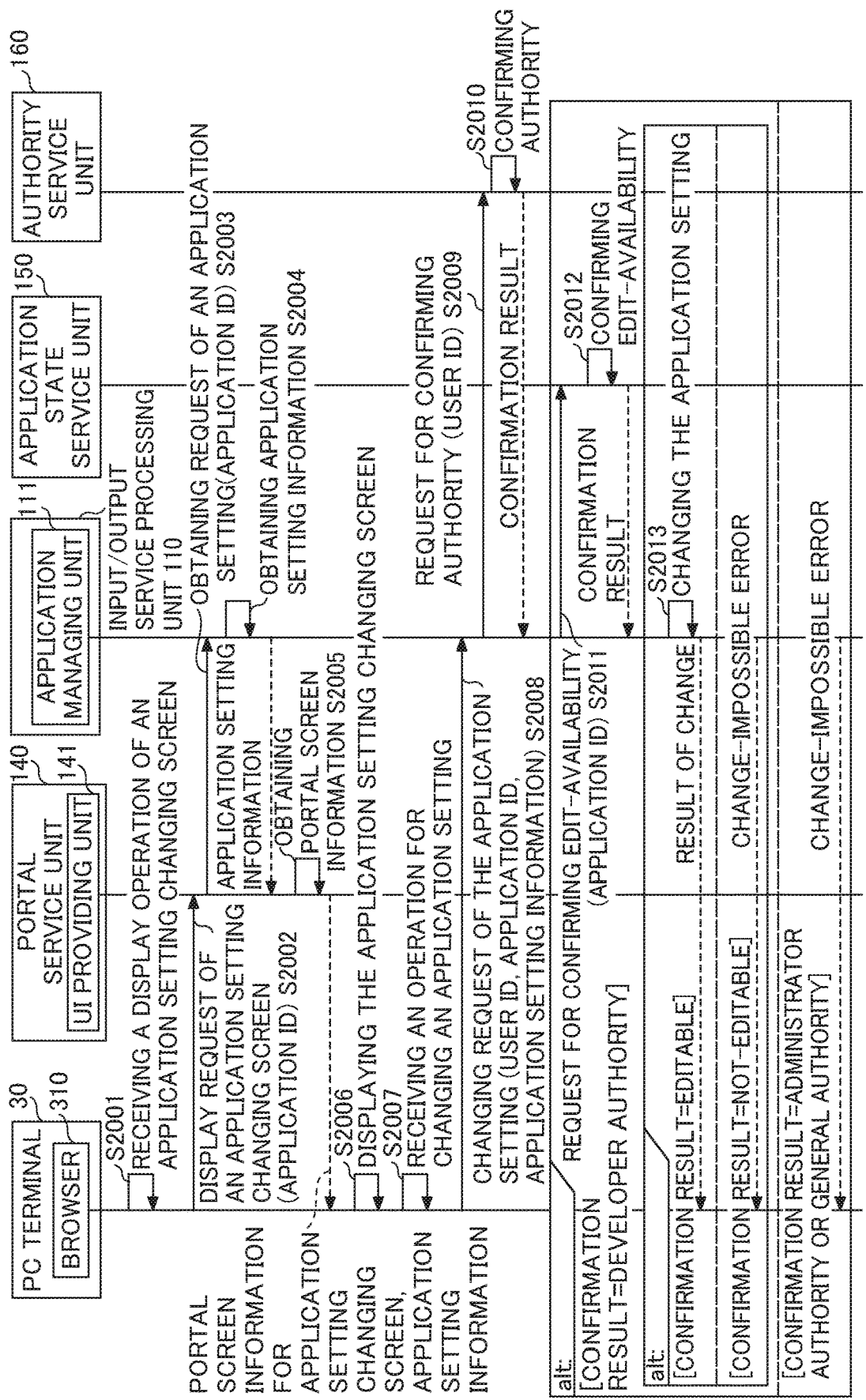
FIG. 20 is a sequence diagram illustrating an example of a process for changing an application setting according to an embodiment.

Hereinafter, a process of changing an application setting (i.e., application setting information 1200) of an application registered in the service providing system 10 is explained, with reference to FIG. 20. FIG. 20 is a sequence diagram illustrating an example of a process of changing an application setting.

First, the browser 310 of a PC terminal 30 receives an operation (i.e., a display operation of an application setting changing screen) for displaying an application setting changing screen (Step S2001). Note that it is possible for a user of the PC terminal 30 to specify, on the portal top screen, for example, an application that the user desires to change an application setting and then press a link button or the like directing to an application setting changing screen, so as to perform a display operation of the application setting changing screen.

Upon receiving the display operation of the application setting changing screen, the browser 310 of the PC terminal 30 transmits a display request of the application setting changing screen to the UI providing unit 141 of the portal service unit 140 (Step S2002). The display request of the application setting changing screen includes the application ID of the application specified by a user.

Upon receiving the display request of the application setting changing screen, the UI providing unit 141 of the portal service unit 140 transmits, to the application managing unit 111 of input/output service processing unit 110, an obtaining request of an application setting (Step S2003). The obtaining request of an application setting includes the application ID described above.

Upon receiving the obtaining request of an application setting, the application managing unit 111 of the input/output service processing unit 110 obtains from the application information memory unit 170 application setting information 1200 associated with the application ID included in the obtaining request (Step S2004). Then, the application managing unit 111 replies to the UI providing unit 141 with the obtained application setting information 1200. As a result, the reply includes the current application setting of an application designated by a user.

When the application managing unit 111 replies with the application setting information 1200, the UI providing unit 141 of the portal service unit 140 obtains portal screen information 3000 for the application setting changing screen from the portal screen information memory unit 190 (Step S2005).

Then, the UI providing unit 141 replies to the browser 310 with the portal screen information 3000 obtained from the portal screen information memory unit 190.

Upon receiving the portal screen information 3000 for the application setting changing screen, the browser 310 of the PC terminal 30 displays the application setting changing screen, based on the portal screen information 3000 (Step S2006). The application setting changing screen is a screen for changing a default value, etc., of a scan setting or a print setting, for example, like the application registration screen G200 illustrated in FIG. 13 or the application registration screen G300 illustrated in FIG. 14. It is possible for a user to perform an operation of changing an application setting by specifying a setting value of a desired application setting on the application setting changing screen.

The browser 310 of the PC terminal 30 receives an operation of changing an application setting (Step S2007).

Upon receiving the operation for changing the application setting, the browser 310 of the PC terminal 30 transmits a request for changing the application setting to the application managing unit 111 of the input/output service processing unit 110 (Step S2008). The request for changing the application setting includes the user ID of a user who has performed the operation of changing the application setting, the application ID of the changing-target application, and changed application setting information 1200.

Upon receiving the request for changing the application setting, the application managing unit 111 of the input/output service processing unit 110 transmits a request for confirming authority to the authority service unit 160 (Step S2009). The request for confirming authority includes the user ID described above.

Upon receiving the request for confirming authority, the authority service unit 160 refers to the authority information memory unit 161 and confirms the authority associated with the user ID included in the confirmation request (Step S2010). Then, the authority service unit 160 replies to the application managing unit 111 with a confirmation result indicative of the confirmed authority.

In a case where the reply includes a confirmation result indicative of "DEVELOPER AUTHORITY", the application managing unit 111 of the input/output service processing unit 110 transmits a request for confirming edit-availability to the application state service unit 150 (Step S2011). The request for confirming edit-availability includes the application ID of the changing-target application.

Upon receiving the request for confirming edit-availability, the application state service unit 150 refers to the application state information memory unit 151 and confirms the application state associated with the application ID included in the confirmation request (Step S2012). Then, the application state service unit 150 replies to the application managing unit 111 with a confirmation result indicative of the confirmed application state.

In a case where the reply includes a confirmation result indicative of "AVAILABLE (POSSIBLE TO EDIT)" or "TEMPORARILY SUSPENDED (POSSIBLE TO EDIT)", the application managing unit 111 of the input/output service processing unit 110 changes an application setting (Step S2013). That is to say, among application setting information 1200 stored in the application information memory unit 170, the application managing unit 111 updates application setting information 1200 associated with the application ID to the changed application setting information 1200. As a result, the application setting of the application is changed.

Then, the application managing unit 111 of the input/output service processing unit 110 replies to the browser 310 of the PC terminal 30 with the change result indicating that the application setting has been changed.

Contrarily, in a case where the authority service unit 160 replies with a confirmation result indicative of "ADMINISTRATOR AUTHORITY" or "GENERAL AUTHORITY", the application managing unit 111 of the input/output service processing unit 110 replies to the browser 310 of the PC terminal 30 a change-impossible error indicating that it is impossible to change the application setting. Similarly, in a case where the application state service unit 150 replies with a confirmation result indicative of "AVAILABLE (IMPOSSIBLE TO EDIT)" or "TEMPORARILY SUSPENDED (IMPOSSIBLE TO EDIT)", the application managing unit 111 of the input/output service processing unit 110 transmits the change-impossible error to the browser 310 of the PC terminal 30. As described above, in a case where the authority of a user of a PC terminal 30 is "ADMINISTRATOR AUTHORITY" or "GENERAL AUTHORITY" or in a case where an application state is "available (not-editable)" or "temporarily suspended (not-editable)", the application managing unit 111 does not permit changing of the application setting.

As described above, in the information processing system 1 according to the present embodiment, it is possible for a user to whom developer authority is granted to use a PC terminal 30 for changing an application setting of an application registered in the service providing system 10 in a case where the application state is "AVAILABLE (POSSIBLE TO EDIT)" or "TEMPORARILY SUSPENDED (POSSIBLE TO EDIT)". Note that, in FIG. 21, only a user to whom developer authority is granted is permitted to change an application setting, but the present invention is not limited thereto. For example, in addition to a user to whom developer authority is granted, a user to whom administrator authority is granted may be permitted to change an application setting as well. Alternatively, for example, permission of changing an application setting may be limited to only a user to whom special authority (e.g., application setting changing authority) for changing an application setting is granted.

<<Use of a Service>>

Figure 21:
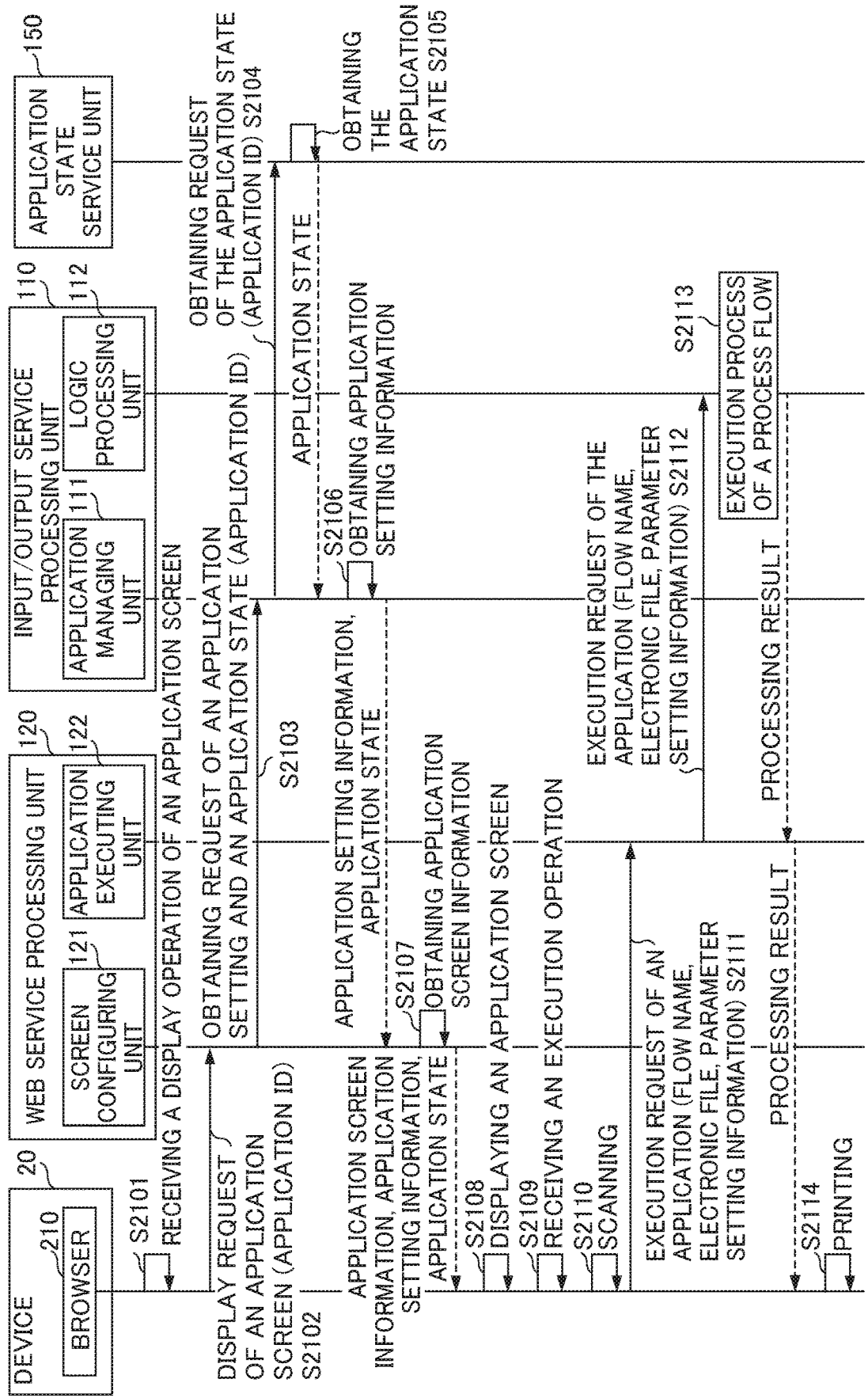
FIG. 21 is a sequence diagram illustrating an example of overall processing in a case of using a QR code printing service according to an embodiment.

Hereinafter, a case where a user of a device 20 uses a QR code printing service provided by a QR code print application is explained, with reference to FIG. 21. FIG. 21 is a sequence diagram illustrating an example of overall processing in a case of using a QR code printing service.

First, the browser 210 of a device 20 receives an operation (i.e., a display operation of an application screen) for displaying an application screen (Step S2101). Note that a user of the device 20 is able to perform a display operation of the application screen, for example, by pressing a shortcut button or the like in which the URL of the application screen is set.

Upon receiving the display operation of the application screen, the browser 210 of the device 20 transmits a display request of the application screen to the screen configuring unit 121 of the web service processing unit 120 (Step S2102). The display request of the application screen includes the application ID of an application that is available with the license applied to a tenant to which the user belongs.

Upon receiving the display request of the application screen, the screen configuring unit 121 of the web service processing unit 120 transmits an obtaining request of an application setting and an application state to the application managing unit 111 of the input/output service processing unit 110 (Step S2103). The obtaining request of an application setting and an application state includes the application ID described above.

Upon receiving the obtaining request of an application setting and an application state, the application managing unit 111 of the input/output service processing unit 110 transmits an obtaining request of an application state to the application state service unit 150 (Step S2104). The obtaining request of an application state includes the application ID described above.

Upon receiving the obtaining request of an application state, the application state service unit 150 obtains from the application state information memory unit 151 the application state associated with the application ID included in the obtaining request (Step S2105). Note that, in a case where multiple application IDs are included in the obtaining request, the application state service unit 150 obtains from the application state information memory unit 151 the application states associated with the multiple application IDs, respectively.

Then, the application state service unit 150 replies to application managing unit 111 with the obtained application state.

When the application state service unit 150 replies with the application state, the application managing unit 111 of the input/output service processing unit 110 transmits from the application information memory unit 170 application setting information 1200 associated with the application ID included in the obtaining request (Step S2106). Note that, in a case where multiple application IDs are included in the obtaining request for obtaining an application setting and an application state, the application managing unit 111 obtains from the application information memory unit 170 application setting information 1200 associated with the multiple application IDs, respectively.

Then, the application managing unit 111 replies to the screen configuring unit 121 with the application setting information 1200 and the application state.

When the application managing unit 111 replies with the application setting information 1200 and the application state, the screen configuring unit 121 of the web service processing unit 120 obtains application screen information 2000 from the application screen information memory unit 180 (Step S2107). Then, the screen configuring unit 121 replies to the browser 210 of the device 20 with the application screen information 2000 obtained from the application screen information memory unit 180, the application setting information 1200, and the application state.

Figure 22:
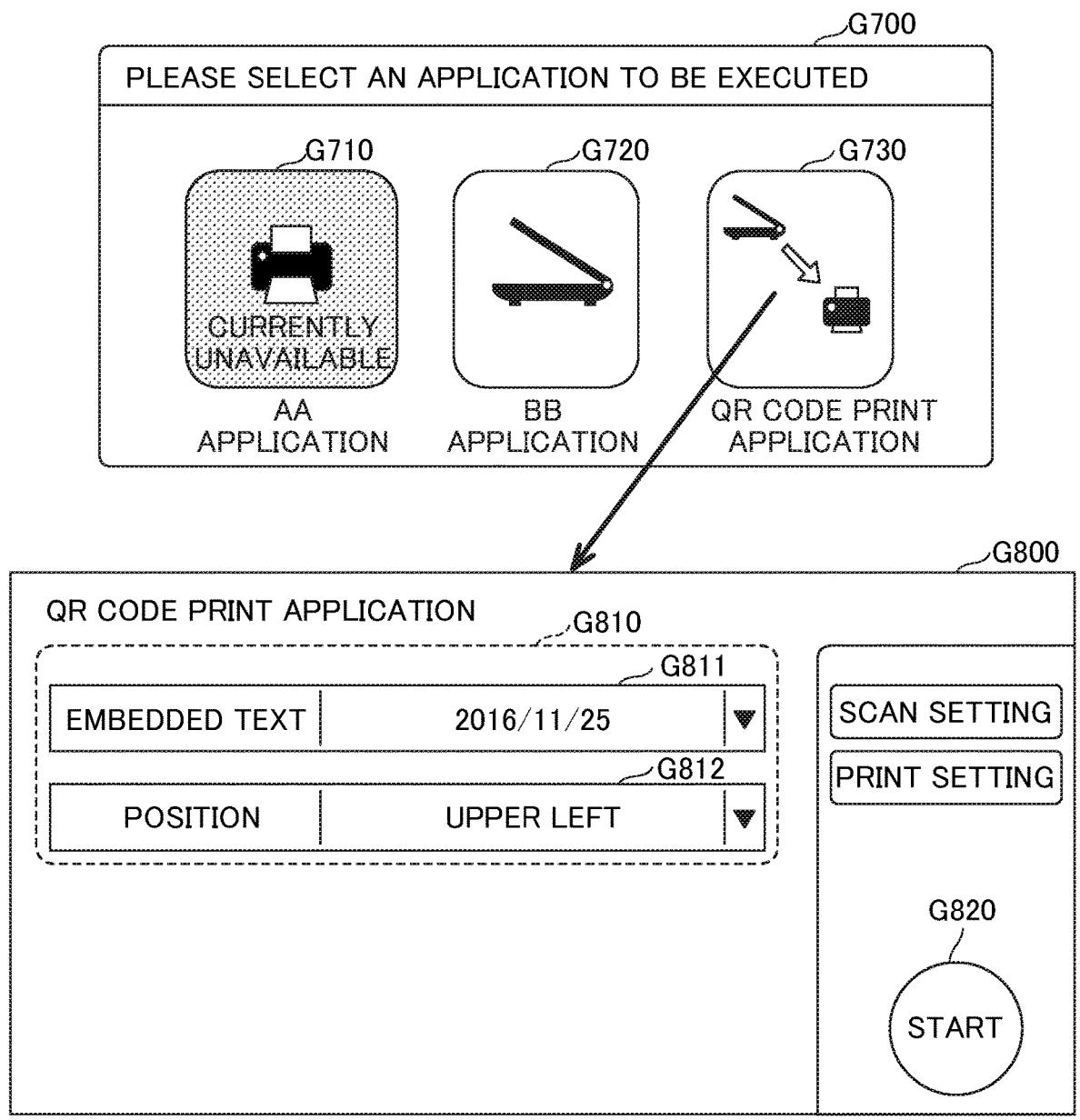
FIG. 22 is a diagram illustrating an example of an application screen according to an embodiment.

The browser 210 of the device 20 displays, for example, the application screen G700 illustrated in FIG. 22, based on the received application screen information 2000, application setting information 1200, and application state (Step S2108). Here, the browser 210 prevents a user from selecting an application whose application state is "TEMPORARILY SUSPENDED (POSSIBLE TO EDIT)" or "TEMPORARILY SUSPENDED (IMPOSSIBLE TO EDIT)".

The application screen G700 illustrated in FIG. 22 is a screen on which an application available with a license applied to the tenant to which a user belongs is displayed. The application screen G700 illustrated in FIG. 22 includes an icon G710 indicative of an "AA application", an icon G720 indicative of a "BB application", and an icon G730 indicative of the "QR code print application". Here, for example, in a case where an application state of the "AA application" is "TEMPORARILY SUSPENDED (POSSIBLE TO EDIT)" or "TEMPORARILY SUSPENDED (IMPOSSIBLE TO EDIT)", the icon G710 indicative of the "AA application" is grayed out such that a user is not able to select.

As described above, on the application screen G700 illustrated in FIG. 22, an application whose application state is "TEMPORARILY SUSPENDED (POSSIBLE TO EDIT)" or "TEMPORARILY SUSPENDED (IMPOSSIBLE TO EDIT)" is grayed out. Hence, a user is not able to select an application whose application state is "TEMPORARILY SUSPENDED (POSSIBLE TO EDIT)" or "TEMPORARILY SUSPENDED (IMPOSSIBLE TO EDIT)". As described above, a user is not able to select an application whose application state is "TEMPORARILY SUSPENDED (POSSIBLE TO EDIT)" or "TEMPORARILY SUSPENDED (IMPOSSIBLE TO EDIT)" among applications available with licenses applied to the tenant to which the user belongs.

Note that, not limited to a case of being grayed out, there may be a case in which an application whose application state is "TEMPORARILY SUSPENDED (POSSIBLE TO EDIT)" or "TEMPORARILY SUSPENDED (IMPOSSIBLE TO EDIT)" is not displayed, for example. Alternatively, for example, there may be a case in which, when an application whose application state is "TEMPORARILY SUSPENDED (POSSIBLE TO EDIT)" or "TEMPORARILY SUSPENDED (IMPOSSIBLE TO EDIT)" is selected, an indication that the application is not available is displayed.

Here, for example, in a case where a user selects the icon G730, the browser 210 displays the application screen G800 illustrated in FIG. 22, for example. The application screen G800 illustrated in FIG. 22 is a screen for using the QR code print application.

The application screen G800 illustrated in FIG. 22 includes a parameter inputting area G810 and a "START" button G820. Further, the parameter inputting area G810 includes an embedded text inputting field G811 and a position inputting field G812.

A user is able to perform an execution operation by inputting at the embedded text inputting field G811 a text to be embedded in a QR code, inputting at the position inputting field G812 a position of an electronic file on which the QR code is to be superimposed, and then pressing the "START" button G820.

Note that a user is able to make a transition to a screen for changing a scan setting from a default value by pressing the "READING SETTING" button on the application screen G800 illustrated in FIG. 22. Similarly, a user is able to make a transition to a screen for changing a print setting from a default value by pressing the "PRINTING SETTING" button on the application screen G800 illustrated in FIG. 22.

The browser 210 of the device 20 receives an execution operation (Step S2109). Upon receiving the execution operation, the browser 210 of the device 20 controls the scanner 26 to read a document and generate an electronic file (i.e., an image file) (Step S2110). Note that, here, reading of the document is performed using a default value set as a scan setting default parameter 1203 of application setting information 1200 or a setting value specified by a user.

When the electronic file (i.e., the image file) is generated, the browser 210 of the device 20 transmits an execution request for executing an application to the application executing unit 122 of the web service processing unit 120 (Step S2111). The execution request for executing an application includes a flow name defined in application setting information 1200, the electronic file generated in the above Step S2110, and the parameter setting information.

Here, the flow name included in the execution request for executing an application is "code-print", which is indicative of processing flow information 1100 for a series of processing for realizing the QR code printing service. Furthermore, the parameter setting information is parameter information in which a parameter value is specified on the application screen G800 (i.e., parameter information in which a parameter value input to the parameter inputting area G810 is specified).

Upon receiving the execution request for executing an application, the application executing unit 122 of the web service processing unit 120 transmits the execution request to the logic processing unit 112 of the input/output service processing unit 110 (Step S2112).

Upon receiving the execution request for executing an application, the logic processing unit 112 of the input/output service processing unit 110 performs an execution process for executing a process flow (Step S2113). That is to say, the logic processing unit 112 executes a series of processes based on the process flow information 1100 having the flow name included in the execution request. Note that details of an execution process for executing a process flow are described below.

Then, the logic processing unit 112 replies to the application executing unit 122 with a processing result of the execution process of executing the process flow. In addition, the application executing unit 122 replies to the browser 210 with the processing result. The processing result included in the reply to the browser 210 is an electronic file on which a QR code is superimposed.

When the application executing unit 122 replies with the processing result, the browser 210 of the device 20 controls the printer 25 to print out the electronic file on which the QR code is superimposed (Step S2114). Hence, the service providing system 10 according to the present embodiment is able to provide the "QR code printing service".

Figure 23:
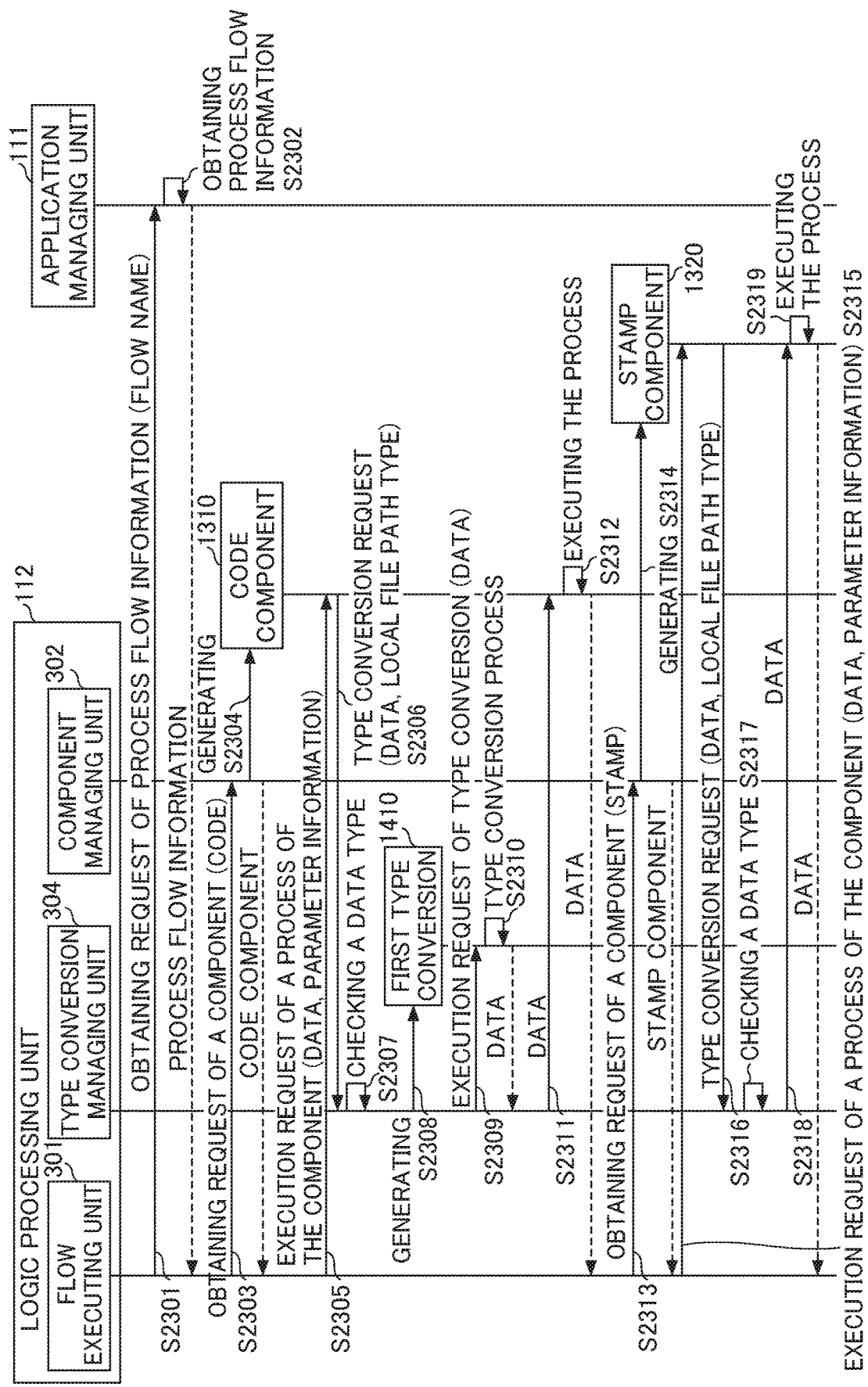
FIG. 23 is a sequence diagram illustrating an example of an execution process for executing a process flow for achieving a QR code printing service according to an embodiment.

Here, details of the execution process (i.e., the process of Step S2113 in FIG. 21) of executing a process flow are described, with reference to FIG. 23. FIG. 23 is a sequence diagram illustrating an example of an execution process of executing a process flow for achieving the QR code printing service.

Upon receiving from the application executing unit 122 an executing request for executing an application, the flow executing unit 301 transmits to the application managing unit 111 an obtaining request for obtaining process flow information (Step S2301). The obtaining request for obtaining process flow information includes the flow name "code-print".

Upon receiving the obtaining request for obtaining a process flow, the application managing unit 111 obtains from the application information memory unit 170 the process flow information 1100 having the flow name "code-print" included in the obtaining request (Step S2302). Then, the application managing unit 111 replies to the flow executing unit 301 the process flow information 1100 (i.e., the process flow information 1100 illustrated in FIG. 10) obtained from the application information memory unit 170.

Next, the flow executing unit 301 transmits to the component managing unit 302 an obtaining request for obtaining a component based on the process flow information 1100 (Step S2303). That is to say, the flow executing unit 301 transmits to the component managing unit 302 an obtaining request for obtaining a component having the component name "code" defined in "component", which is included in detail process definition 1110 of the process flow information 1100 illustrated in FIG. 10.

Upon receiving the obtaining request for obtaining a component, the component managing unit 302 generates a component having the component name "code" (i.e., a code component 1310) (Step S2304). Generation of the code component 1310 may be performed using an API for generating a component defined in the component common I/F 1300.

Then, the component managing unit 302 replies to the flow executing unit 301 with the generated code component 1310. That is to say, the component managing unit 302 replies to the flow executing unit 301 with an address on a memory (e.g., the RAM 14) in which the code component 1310 is expanded, for example.

Next, the flow executing unit 301 transmits a component execution request to the code component 1310 (Step S2305). The component execution request includes data and parameter information.

Here, data is an electronic file whose data type is "InputStream", which is received from the browser 210. That is to say, the flow executing unit 301 passes the electronic file received from the browser 210 to the code component 1310 simply as "data" (without making a difference depending on data type) and requests for executing a process. In the present embodiment, various kinds of information such as an electronic file in which a difference is not made depending on data type are simply referred to as "data".

Furthermore, the parameter information is parameter information used by the code component 1310 (i.e., parameter information in which a parameter value input to the text inputting field G811 is specified) among the parameter information included in the execution request for executing an application.

Upon receiving the component execution request, the code component 1310 transmits a type conversion request to the type conversion managing unit 304 (Step S2306). The type conversion request includes data and specification of "LocalFilePath", which is indicative of a data type that is compatible with the code component 1310.

Upon receiving the type conversion request, the type conversion managing unit 304 checks whether the data type of the data included in the type conversion request matches with the specified data type (Step S2307).

Here, the data type of the data included in the type conversion request is "InputStream", whereas the specified data type is "LocalFilePath". Therefore, the type conversion managing unit 304 determines that the data type of the data included in the type conversion request does not match with the specified data type.

Then, the type conversion managing unit 304 refers to the type conversion information table 4000 and specifies type conversion for converting the data type "InputStream" to "LocalFilePath" (here, the first type conversion 1410 is specified). Then, the type conversion managing unit 304 generates the first type conversion 1410 that has been specified (Step S2308). Note that generation of the first type conversion 1410 may be performed using the type conversion common I/F 1400.

Next, the type conversion managing unit 304 transmits to the first type conversion 1410 an execution request for executing a type conversion process (Step S2309). Upon receiving the execution request for executing the type conversion, the first type conversion 1410 performs a type conversion process for converting the data type of the data included in the execution request from "InputStream" to "LocalFilePath" (Step S2310). Then, the first type conversion 1410 replies to the type conversion managing unit 304 with data whose data type has been converted.

Upon receiving the data (i.e., data whose data type has been converted) from the first type conversion 1410, the type conversion managing unit 304 transmits the data to the code component 1310 (Step S2311).

Upon receiving the data from the type conversion managing unit 304, the code component 1310 executes a process on the data using parameter information (Step S2312). That is to say, the code component 1310 generates a QR code in which a text input in the embedded text inputting field G811 of the application screen G800 illustrated in FIG. 22 is embedded.

Then, the code component 1310 replies to the flow executing unit 301 with data indicative of a processing result (i.e., the QR code) and an electronic file (i.e., the electronic file received from the browser 210).

Next, the flow executing unit 301 transmits to the component managing unit 302 an obtaining request for obtaining a component based on the process flow information 1100 (Step S2313). That is to say, the flow executing unit 301 transmits to the component managing unit 302 an obtaining request for obtaining a component having the component name "stamp" defined in "component", which is included in detail process definition 1120 of the process flow information 1100 illustrated in FIG. 10.

Upon receiving the obtaining request for obtaining a component, the component managing unit 302 generates a component having a component name "stamp" (i.e., a stamp component 1320) (Step S2314). Generation of the stamp component 1320 may be performed using an API for generating a component defined in the component common I/F 1300.

Then, the component managing unit 302 replies to the flow executing unit 301 with the generated stamp component 1320. That is to say, the component managing unit 302 replies to the flow executing unit 301 with an address on a memory (e.g., the RAM 14) in which the stamp component 1320 is expanded, for example.

Next, the flow executing unit 301 transmits a component execution request to the stamp component 1320 (Step S2315). Note that the execution request includes data whose data type is "LocalFilePath" and parameter information. The parameter information is parameter information used by the stamp component 1320 (i.e., parameter information in which a parameter value input to the position inputting field G812 is specified) among the parameter information included in the execution request for executing an application.

Upon receiving the component execution request, the stamp component 1320 transmits a type conversion request to the type conversion managing unit 304 (Step S2316). The type conversion request includes data and specification of "LocalFilePath", which is indicative of a data type that is compatible with the stamp component 1320.

Upon receiving the type conversion request, the type conversion managing unit 304 checks whether the data type of the data included in the type conversion request matches with the specified data type (Step S2317).

Here, the data type of the data included in the type conversion request is "LocalFilePath", and the specified data type is "LocalFilePath" as well. Therefore, the type conversion managing unit 304 determines that the data type of the data included in the type conversion request matches with the specified data type.

Then, the type conversion managing unit 304 transmits the data included in the type conversion request to the stamp component 1320 (Step S2318).

Upon receiving the data from the type conversion managing unit 304, the stamp component 1320 executes a process on the data using the parameter information (Step S2319). That is to say, the stamp component 1320 superimposes a QR code on an electronic file, such that the QR code is at the position input to the position inputting field G812 of the application screen G800 illustrated in FIG. 22. Hence, an electronic file on which the QR code is superimposed at the specified position is created.

Then, the stamp component 1320 replies to the flow executing unit 301 with data indicating the electronic file on which the QR code is superimposed.

As described above, execution of a series of processing (i.e., a process flow) based on the process flow information 1100 illustrated in FIG. 10 is completed. Hence, the service providing system 10 according to the present embodiment is able to transmit to a device 20 an electronic file on which a QR code is superimposed. Then, by printing the electronic file using the device 20, it is possible to provide the QR code printing service to a user.

Conventionally, it has not been possible to temporarily suspend usage of a once released application. Therefore, it has not been possible to cope with a case where it is desired to temporarily suspend usage of an application, for example, to fix a bug or the like in an application.

According to the above-described one or more embodiments, usage of an application may be temporarily suspended.

The present invention is not limited to the embodiment specifically disclosed above, and various modifications and changes are possible without departing from the scope of the claims.

Any one of the above-described operations may be performed in various other ways, for example, in an order different from the one described above.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing system communicably connected with an electronic device, the information processing system comprising:
at least one memory configured to,
store, for each of a plurality of applications registered to the information processing system, flow information defining a series of processes to be executed by the electronic device on electronic data to provide an application of the plurality of applications, the flow information associating identification information for identifying each of components performing the series of processes and an execution order of the series of processes, and
store, for each of the plurality of applications, application state information indicating at least whether the application is in an available state or an unavailable state; and
processing circuitry configured to,
control a display of the electronic device to display a screen for allowing selection of one or more of the plurality of applications whose application state information indicates that the application is in the available state,
control the electronic device to execute the series of processes on the electronic data according to the flow information of a selected application, in response to a selection of one of the applications in the available state, and
change the application state information stored in the at least one memory in response to a request to change the application state information.

2. The information processing system according to claim 1, wherein the processing circuitry is configured to control the display of the electronic device to display the screen, such that the screen does not allow selection of one or more of the plurality of applications whose application state information indicates that the application is in the unavailable state.

3. The information processing system according to claim 1,
wherein the at least one memory further stores, for each one of the plurality of applications, application setting information defining a setting of the application, and
the application state information further indicates whether the application setting information is editable.

4. The information processing system according to claim 3, wherein the processing circuitry is further configured to,
determine whether the application setting information is editable, based on the application state information of a specific application, in response to a request for changing the application setting information for the specific application of the plurality of applications from an information terminal, and
change the application setting information stored in the at least one memory in response to the application setting information for the specific application being editable.

5. The information processing system according to claim 4, wherein the processing circuitry is further configured to,
determine whether a user is granted with a first authority, and change the application state information in response to the request for changing the application state information in response to determining that the user is granted with the first authority.

6. The information processing system according to claim 5, wherein the processing circuitry is further configured to determine whether the application state information indicates that the application setting information is editable, in response to determining that the user of the information terminal is granted with second authority.

7. The information processing system according to claim 1, wherein the processing circuitry is further configured to change the application state information stored in the at least one memory in response to the request to change the application state information received from an information terminal.

8. The information processing system according to claim 1, further comprising:
the electronic device configured to display the screen that lists the applications for selection by a user.

9. The information processing system of claim 1, wherein the processing circuitry is configured to change the application state information stored in the at least one memory in response to the request to change the application state information from a user having first authority such that when the application state information for the selected application is changed to the unavailable state, the electronic device is configured to not allow subsequent selection thereof.

10. The information processing system of claim 1, wherein the unavailable state includes at least a suspended state, and the processing circuitry is configured to control the display of the electronic device to display the screen such that ones of the plurality of applications whose associated application state information is the suspended state are grayed-out on the display.

11. The information processing system of claim 1, wherein the application state information is changeable between at least an available non-editable state and an available editable state, and, in the available non-editable state, a user having first authority is unable to edit application setting information defining a setting of the application.

12. An information processing apparatus communicably connected with an electronic device, the information processing apparatus comprising:
a memory configured to store, for each one of a plurality of applications registered to the information processing apparatus: 1) flow information defining a series of processes to be executed by the electronic device on electronic data to provide an application of the plurality of applications, the flow information associating identification information for identifying each of components performing the series of processes and an execution order of the series of processes; and 2) application state information indicating at least whether the application is in an available state or an unavailable state; and
processing circuitry configured to,
control a display of the electronic device to display a screen for allowing selection of one or more of the plurality of applications whose application state information indicates that the application is in the available state,
control the electronic device to execute the series of processes on the electronic data according to the flow information of a selected application, in response to a selection of one of the applications in the available state, and change the application state information stored in the memory in response to a request to change the application state information.

13. The information processing apparatus according to claim 12, wherein
the memory further stores, for each one of the plurality of applications, application setting information defining a setting of the application, the application state information further indicating whether the application setting information is editable, and
the processing circuitry is further configured to,
determine whether the application setting information is editable, based on the application state information of a specific application, in response to a request for changing the application setting information for the specific application of the plurality of applications from an information terminal, and
change the application setting information stored in the memory in response to the application setting information for the specific application being editable.

14. The information processing apparatus of claim 12, wherein the processing circuitry is configured to change the application state information stored in the memory in response to the request to change the application state information from a user having first authority such that when the application state information for the selected application is changed to the unavailable state, the electronic device is configured to not allow subsequent selection thereof.

15. The information processing apparatus of claim 12, wherein the unavailable state includes at least a suspended state, and the processing circuitry is configured to control the display of the electronic device to display the screen such that ones of the plurality of applications whose associated application state information is the suspended state are grayed-out on the display.

16. The information processing apparatus of claim 12, wherein the application state information is changeable between at least an available non-editable state and an available editable state, and, in the available non-editable state, a user having first authority is unable to edit application setting information defining a setting of the application.

17. An information processing method, performed by an information processing apparatus communicably connected with an electronic device, the method comprising:
storing in a memory, for each of a plurality of applications registered to the information processing apparatus, flow information defining a series of processes to be executed by the electronic device on electronic data to provide an application of the plurality of applications, the flow information associating identification information for identifying each of components performing the series of processes and an execution order of the series of processes;
storing in the memory, for each of the plurality of applications, application state information indicating at least whether the application is in an available state or an unavailable state;
controlling a display of the electronic device to display a screen for allowing selection of one or more of the plurality of applications whose application state information indicates that the application is in the available state;
controlling the electronic device to execute the series of processes on the electronic data according to the flow information of a selected application, in response to a selection of one of the applications in the available state; and
changing the application state information stored in the memory in response to a request to change the application state information.

18. The information processing method according to claim 17, further comprising:
storing in the memory, for each one of the plurality of applications, application setting information defining a setting of the application, wherein the application state information further indicates whether the application setting information is editable;
determining whether the application setting information is editable, based on the application state information of a specific application, in response to a request for changing the application setting information for the specific application of the plurality of applications from an information terminal; and
changing the application setting information stored in the memory in response to the application setting information for the specific application being editable.

19. The information processing method of claim 17, wherein the unavailable state includes at least a suspended state, and the controlling the display controls the display of the electronic device to display the screen such that ones of the plurality of applications whose associated application state information is the suspended state are grayed-out on the display.

20. The information processing method of claim 17, wherein the application state information is changeable between at least an available non-editable state and an available editable state, and, in the available non-editable state, a user having first authority is unable to edit application setting information defining a setting of the application.

* * * * *